United States Patent
Takahashi

(10) Patent No.: US 11,233,947 B2
(45) Date of Patent: Jan. 25, 2022

(54) IMAGING APPARATUS, FINDER DISPLAY CONTROL METHOD OF IMAGING APPARATUS, AND FINDER DISPLAY CONTROL PROGRAM OF IMAGING APPARATUS

(71) Applicant: FUJIFILM Corporation, Tokyo (JP)

(72) Inventor: Kosuke Takahashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/862,087

(22) Filed: Apr. 29, 2020

(65) Prior Publication Data

US 2020/0259985 A1 Aug. 13, 2020

Related U.S. Application Data

(63) Continuation of application No. PCT/JP2018/039710, filed on Oct. 25, 2018.

(30) Foreign Application Priority Data

Oct. 31, 2017 (JP) .............. JP2017-210220

(51) Int. Cl.
*H04N 5/235* (2006.01)
*G03B 7/08* (2021.01)
(Continued)

(52) U.S. Cl.
CPC ............. *H04N 5/2352* (2013.01); *G03B 7/08* (2013.01); *G03B 7/26* (2013.01); *H04N 5/2254* (2013.01)

(58) Field of Classification Search
CPC ...... H04N 5/2352; H04N 5/2254; G03B 7/08; G03B 7/26
See application file for complete search history.

(56) References Cited

U.S. PATENT DOCUMENTS

2014/0002709 A1 1/2014 Sakurabu
2014/0211050 A1* 7/2014 Nakamaru ......... H04N 5/23293
   348/252
2014/0247386 A1 9/2014 Takagi

FOREIGN PATENT DOCUMENTS

JP   2003-78785 A    3/2003
JP   2007-336169 A  12/2007
(Continued)

OTHER PUBLICATIONS

International Preliminary Report on Patentability and Written Opinion of the International Searching Authority (Forms PCT/IB/326, PCT/IB/373, and PCT/ISA/237) for International Application No. PCT/JP2018/039710, dated May 14, 2020, with English translation.
(Continued)

*Primary Examiner* — Twyler L Haskins
*Assistant Examiner* — Fayez A Bhuiyan
(74) *Attorney, Agent, or Firm* — Birch, Stewart, Kolasch & Birch, LLP.

(57) ABSTRACT

Provided are an imaging apparatus capable of ensuring favorable visibility of display in a finder from when power is applied, a finder display control method of the imaging apparatus, and a finder display control program of the imaging apparatus. A viewfinder (30), which superimposes a display of a finder LCD (36) on an optical image of a subject observed through an observation optical system (32), includes a variable ND filter (40) that adjusts the light amount of the optical image of the subject. While power of the digital camera is turned off, information about the time is acquired, and the target transmittance of the variable ND filter (40) is updated on the basis of the information about the transmittance determined for each time zone. In a case where the target transmittance is updated, the variable ND (Continued)

filter (40) is driven to change the transmittance of the variable ND filter (40) to the target transmittance.

19 Claims, 18 Drawing Sheets

(51) Int. Cl.
*G03B 7/26* (2021.01)
*H04N 5/225* (2006.01)

(56) References Cited

FOREIGN PATENT DOCUMENTS

| | | | |
|---|---|---|---|
| JP | 2013-88597 | A | 5/2013 |
| JP | 2014-48491 | A | 3/2014 |
| JP | 2014-48492 | A | 3/2014 |
| WO | WO 2012/120952 | A1 | 9/2012 |

OTHER PUBLICATIONS

International Search Report (Form PCT/ISA/210) for International Application No. PCT/JP2018/039710, dated Jan. 22, 2019, with English translation.

\* cited by examiner

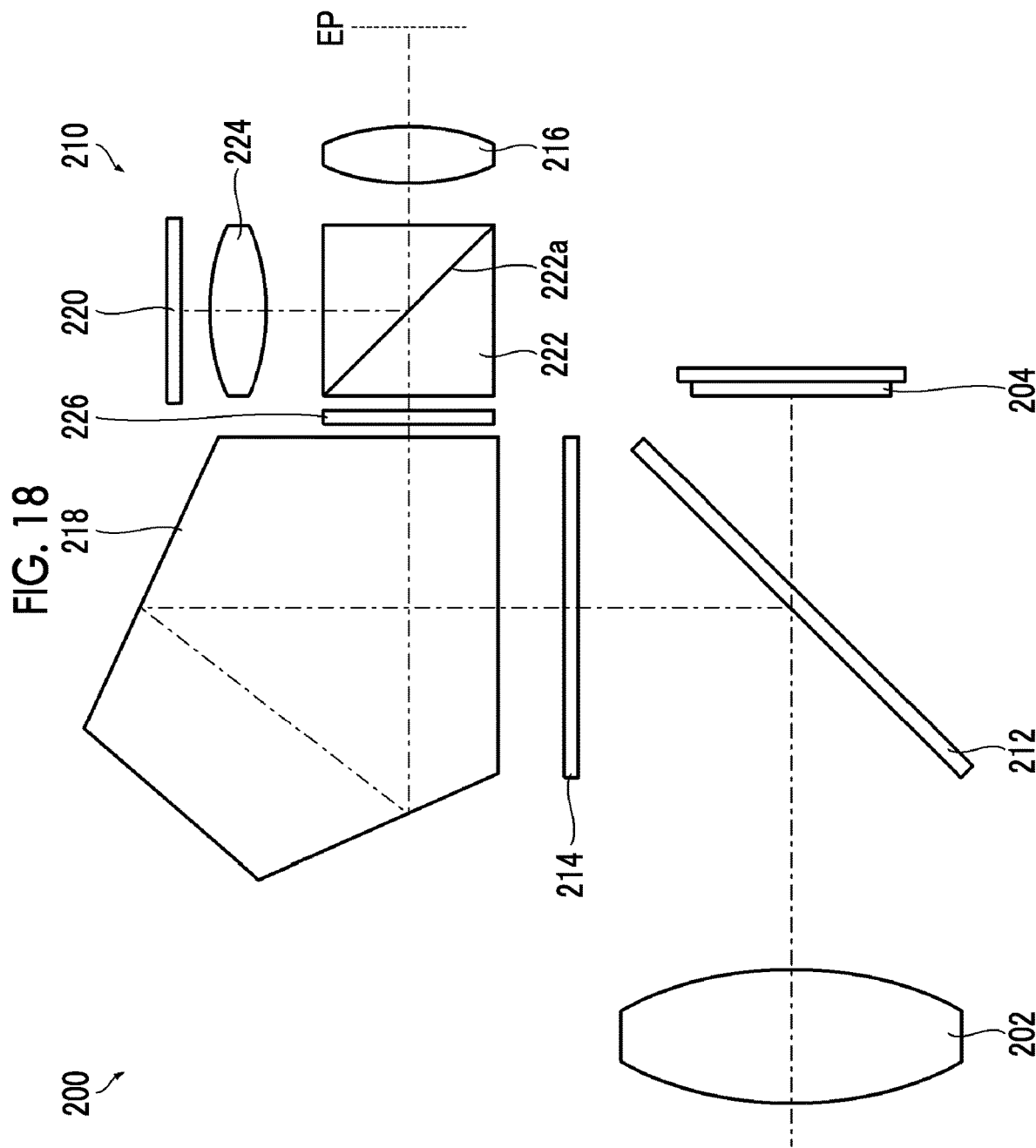

IMAGING APPARATUS, FINDER DISPLAY CONTROL METHOD OF IMAGING APPARATUS, AND FINDER DISPLAY CONTROL PROGRAM OF IMAGING APPARATUS

CROSS-REFERENCE TO RELATED APPLICATIONS

The present application is a Continuation of PCT International Application No. PCT/JP2018/039710 filed on Oct. 25, 2018 claiming priority under 35 U.S.C § 119(a) to Japanese Patent Application No. 2017-210220 filed on Oct. 31, 2017. Each of the above applications is hereby expressly incorporated by reference, in its entirety, into the present application.

BACKGROUND OF THE INVENTION

1. Field of the Invention

The present invention relates to an imaging apparatus, a finder display control method of the imaging apparatus, and a finder display control program of the imaging apparatus. Particularly, the present invention relates to an imaging apparatus having a function of showing various types of information about a screen of an optical finder, a finder display control method of the imaging apparatus, and a finder display control program of the imaging apparatus.

2. Description of the Related Art

An imaging apparatus having a function of showing various types of information on a screen of an optical finder is known. This function is realized by overlapping the display of the display device with a half mirror. However, in the case of a configuration in which the display of the display device is viewed again with the half mirror, there is a problem that in a case where the surrounding environment is bright, the display of the display device blends into the background, thereby making it difficult to visually recognize the display. In order to solve this problem, JP2014-048491A and JP2003-078785A each proposes a technique where an variable ND filter (ND: Neutral Density) is disposed in an optical finder and a transmittance of the variable ND filter is changed in accordance with the brightness of external light.

However, the variable ND filter has a disadvantage in that the operating speed is slow and a certain latency time is necessary for switching. Therefore, in a case where the transmittance of the variable ND filter is switched, there is a disadvantage in that the visibility of the finder display is reduced for a certain period of time.

In order to solve such a problem of the variable ND filter, JP2007-336169A proposes a technique of measuring external light while driving of an image sensor is stopped and changing the transmittance of a variable ND filter in accordance with the result of the photometry, in a digital camera in which a variable ND filter is incorporated in an imaging lens. According to JP2007-336169A, the transmittance of the variable ND filter is changed while the driving of the image sensor is stopped. Therefore, the imaging can be performed without latency time.

SUMMARY OF THE INVENTION

However, JP2007-336169A does not specify anything about the processing while power of the digital camera is turned off. For this reason, the technique of JP2007-336169A also has a problem as follows. In a case where the power is turned on, a certain latency time is necessary for switching the transmittance of the variable ND filter, and during that time, the visibility of the finder display is reduced.

On the other hand, it is conceivable that the external light is constantly measured even while power is turned off, and the transmittance of the variable ND filter is changed in accordance with the result of the photometry. However, in a case where the photometry is constantly performed even while power is turned off, there is a disadvantage in that power is consumed while power is turned off.

The present invention has been made in view of such circumstances, and its object is to provide an imaging apparatus capable of ensuring favorable visibility of display in a finder from when power is turned on, a finder display control method of the imaging apparatus, and a finder display control program of the imaging apparatus.

The means for solving the above problems are as follows.

(1) An imaging apparatus comprising: an optical finder through which an optical image of a subject is observed; a display device (display); a superimposing optical element that is disposed in an optical path of the optical finder so as to superimpose display of the display device on the optical image of the subject observed through the optical finder; a variable ND filter that is disposed in an optical path of the optical finder so as to adjust a light amount of the optical image of the subject incident into the superimposing optical element; a power operation unit (power switch) that turns on and off power of the imaging apparatus; a time measurement unit (clock) that measures a time; a target transmittance updating unit (processor) that acquires information about the time from the time measurement unit and updates a target transmittance of the variable ND filter on the basis of information about a transmittance determined for each time zone while power is turned off; and a variable ND filter control unit that changes the transmittance of the variable ND filter to the target transmittance by driving the variable ND filter in a case where the target transmittance is updated.

According to this aspect, the variable ND filter is provided in the optical path of the optical finder. In a case where using the optical finder in a bright environment, lower the transmittance of the variable ND filter. Thereby, it becomes easy to view the finder display even in a bright environment. On the other hand, the variable ND filter has a disadvantage in that it takes a certain period of time to switch the transmittance. In this aspect, in a case where power of the imaging apparatus is turned off, the target transmittance of the variable ND filter is automatically updated in accordance with the time. That is, information about the transmittance to be set is determined for each time zone, and on the basis of the information, the target transmittance of the variable ND filter is automatically updated while power is turned off. For example, the time zone is divided into a daytime zone and a nighttime zone, and the transmittance to be set for each time zone is determined. During the daytime, it can be estimated that the surroundings are bright. Therefore, the transmittance is set to a low value. On the other hand, during the nighttime, it can be estimated that the surroundings are dark. Therefore, the transmittance is set to a high value. In a case where the target transmittance is updated, the variable ND filter is driven, and the transmittance of the variable ND filter is switched to the updated target transmittance. As a result, the visibility of the finder display can be satisfactorily ensured from when the power is turned on. Also, power consumption during power off can be suppressed.

(2) The imaging apparatus according to (1), further comprising: a preliminary imaging operation detection unit (a preliminary imaging operation detector) that detects a preliminary imaging operation; and a photometry unit (illuminance sensor) that measures external light in a case where the preliminary imaging operation detection unit detects the preliminary imaging operation while power is turned off, where in a case where the preliminary imaging operation detection unit detects a preliminary imaging operation while power is turned off, the target transmittance updating unit acquires a result of photometry of the photometry unit, and updates the target transmittance to a transmittance according to the result of photometry of the photometry unit.

According to this aspect, in a case where the preliminary imaging operation is detected while power is turned off, the external light is measured by the photometry unit, and the target transmittance of the variable ND filter is updated on the basis of the result of photometry. Thereby, it is possible to set a more appropriate transmittance than that at the time of power on. In addition, since photometry is performed in a case where a preliminary imaging operation is detected, power consumption can be suppressed.

Here, the preliminary imaging operation is defined as an operation performed by the user on the imaging apparatus in a case of newly starting imaging from a power off state. For example, an operation of holding the imaging apparatus corresponds to this.

(3) The imaging apparatus according to (2), further comprising a target transmittance update availability determination unit (processor) that determines whether or not the target transmittance can be updated, in a case where the preliminary imaging operation detection unit detects the preliminary imaging operation while power is turned off, where in a case where it is determined that the target transmittance can be updated, the target transmittance updating unit updates the target transmittance to a transmittance according to the result of photometry of the photometry unit.

According to this aspect, in a case where the preliminary imaging operation is detected while power is turned off, it is determined whether or not the target transmittance can be updated, and only in a case where the target transmittance can be updated, the target transmittance is updated. For example, in a case where the imaging apparatus is housed in a casing or the like, a dark state is constantly detected. Therefore, in a case where the target transmittance is updated on the basis of the result of photometry, a problem may occur instead. For this reason, it is determined in advance whether or not updating is possible, and only in a case where updating is possible, the target transmittance is updated. Thereby, the target transmittance can be appropriately updated.

(4) The imaging apparatus according to (3), where the target transmittance update availability determination unit determines whether or not the target transmittance can be updated on the basis of the result of photometry of the photometry unit.

According to this aspect, it is determined whether or not the target transmittance can be updated on the basis of the result of photometry of the photometry unit. For example, in a case where the same measurement result is obtained by performing photometry a plurality of times, a situation in which the imaging apparatus is housed in a casing or the like is assumed, and updating of the target transmittance is prohibited. As described above, by using the result of photometry, it is possible to determine whether or not the target transmittance is available.

(5) The imaging apparatus according to any one of (2) to (4), further comprising a level, where the preliminary imaging operation detection unit detects a horizontal state or a vertical state with the level, and detects a preliminary imaging operation.

According to the present aspect, the preliminary imaging operation is detected by detecting the horizontal state or the vertical state with the level. That is, by detecting the horizontal state or the vertical state, it is detected that the imaging apparatus is held, and the preliminary imaging operation is detected. Usually, a user holds the imaging apparatus horizontally or vertically to take an image. Therefore, by detecting the horizontal state or the vertical state of the imaging apparatus, it is possible to detect that the imaging apparatus is held. Further, by detecting that the imaging apparatus is held, it is possible to detect that the preliminary imaging operation is performed. Here, the horizontal state includes a range that can be regarded as substantially horizontal. Similarly, the vertical state includes a range that can be regarded as substantially vertical. Therefore, the horizontal state or the vertical state detected by the level includes a substantially horizontal state or a substantially vertical state.

(6) The imaging apparatus according to any one of (2) to (5), where the photometry unit measures external light on the basis of an output of an image sensor.

According to this aspect, the photometry unit measures the external light on the basis of the output of the image sensor. That is, the image sensor also functions as a photometric sensor. Thereby, the configuration can be simplified.

(7) The imaging apparatus according to any one of (2) to (5), where the photometry unit is composed of an illuminance sensor.

According to this aspect, the photometry unit is composed of the illuminance sensor. Thereby, external light can be measured more appropriately, and the target transmittance can be set more appropriately.

(8) The imaging apparatus according to any one of (2) to (7), further comprising: a remaining battery capacity detection unit (remaining battery capacity detector) that detects a remaining battery capacity; and an operation restriction unit (processor) that restricts operations of the target transmittance updating unit and the preliminary imaging operation detection unit in accordance with a remaining battery capacity detected by the remaining battery capacity detection unit.

According to this aspect, the operations of the target transmittance updating unit and the preliminary imaging operation detection unit are restricted in accordance with the remaining battery capacity. Thereby, it is possible to prevent a problem that an image cannot be captured due to a shortage of a battery. The operation restriction is performed stepwise. For example, in a case where the remaining battery capacity is equal to or less than the first remaining capacity, the operation of the preliminary imaging operation detection unit is stopped. In this case, only updating is performed in time. Further, in a case where the remaining battery capacity is equal to or less than a second remaining capacity that is smaller than the first remaining capacity, the operation of the target transmittance updating unit is stopped. In this case, the update processing during power off is not performed.

(9) The imaging apparatus according to any one of (1) to (8), where the optical finder is composed of an optical system, which is independent of an imaging lens, to observe an optical image of a subject incident through a finder window unit (finder window) from an eyepiece unit (eyepiece).

According to this aspect, the optical finder is composed of an optical system independent of the imaging lens. That is, the optical finder is composed of not a reflex finder (a finder in which light passing through an imaging lens is reflected by a mirror and an image is formed on a focusing screen and through which an image on the focusing screen is observed) but a viewfinder through which a virtual image or a see-through real image is observed. The viewfinder is sensitive to external light. Therefore, the present invention works particularly effectively in a case where the present invention is applied to the viewfinder.

(10) The imaging apparatus according to (9), where the variable ND filter is provided in the finder window unit.

According to this aspect, the variable ND filter is provided in the finder window unit of the viewfinder. Thereby, it is possible to appropriately adjust the light amount of light incident into the optical finder.

(11) The imaging apparatus according to any one of (1) to (10), where the variable ND filter is composed of the electrochromic element.

According to this aspect, the variable ND filter is composed of an electrochromic element (EC element). The electrochromic element is an optical element that utilizes an electrochromic phenomenon in which the color of a substance is reversibly changed by an electrochemical oxidation-reduction reaction caused by application of a voltage. The electrochromic element has a characteristic that the operating speed is slow since the electrochromic element utilizes a chemical reaction. Therefore, the present invention works particularly effectively.

(12) A finder display control method of an imaging apparatus including an optical finder through which an optical image of a subject is observed, a display device, a superimposing optical element that is disposed in an optical path of the optical finder so as to superimpose display of the display device on the optical image of the subject observed through the optical finder, and a variable ND filter that is disposed in an optical path of the optical finder so as to adjust a light amount of the optical image of the subject incident into the superimposing optical element, the method comprising: a step of acquiring information about a time and updating a target transmittance of the variable ND filter on the basis of information about a transmittance determined for each time zone while power of the imaging apparatus is turned off; and a step of changing the transmittance of the variable ND filter to the target transmittance by driving the variable ND filter in a case where the target transmittance is updated.

According to this aspect, in a case where power of the imaging apparatus is turned off, the target transmittance of the variable ND filter is automatically updated in accordance with the time. As a result, the visibility of the finder display can be satisfactorily ensured from when the power is turned on. Also, power consumption during power off can be suppressed.

(13) The finder display control method of the imaging apparatus according to (12), further comprising: a step of detecting a preliminary imaging operation while power of the imaging apparatus is turned off; a step of measuring external light in a case where a preliminary imaging operation is detected; a step of acquiring a result of photometry of external light and updating the target transmittance to a transmittance according to the result of photometry.

According to this aspect, in a case where the preliminary imaging operation is detected while power is turned off, the external light is measured by the photometry unit, and the target transmittance of the variable ND filter is updated on the basis of the result of photometry. Thereby, it is possible to set a more appropriate transmittance than that at the time of power on. In addition, since photometry is performed in a case where a preliminary imaging operation is detected, power consumption can be suppressed.

(14) The finder display control method of the imaging apparatus according to (13), further comprising a step of determining whether or not the target transmittance can be updated in a case where the preliminary imaging operation is detected, where in a case where it is determined that the target transmittance can be updated, the target transmittance is updated to a transmittance according to the result of photometry of the external light.

According to this aspect, in a case where the preliminary imaging operation is detected while power is turned off, it is determined whether or not the target transmittance can be updated, and only in a case where the target transmittance can be updated, the target transmittance is updated. Thereby, the target transmittance can be appropriately updated.

(15) The finder display control method of the imaging apparatus according to (14), further comprising a step of determining whether or not the target transmittance can be updated on the basis of the result of photometry of the external light.

According to this aspect, it is determined whether or not the target transmittance can be updated on the basis of the result of photometry of the photometry unit.

(16) A finder display control program of an imaging apparatus including an optical finder through which an optical image of a subject is observed, a display device, a superimposing optical element that is disposed in an optical path of the optical finder so as to superimpose display of the display device on the optical image of the subject observed through the optical finder, and a variable ND filter that is disposed in an optical path of the optical finder so as to adjust a light amount of the optical image of the subject incident into the superimposing optical element, the program for causing a computer to execute: a function of acquiring information about a time and updating a target transmittance of the variable ND filter on the basis of information about a transmittance determined for each time zone while power of the imaging apparatus is turned off; and a function of changing the transmittance of the variable ND filter to the target transmittance by driving the variable ND filter in a case where the target transmittance is updated.

According to this aspect, in a case where power of the imaging apparatus is turned off, the target transmittance of the variable ND filter is automatically updated in accordance with the time. As a result, the visibility of the finder display can be satisfactorily ensured from when the power is turned on. Also, power consumption during power off can be suppressed.

(17) The finder display control program of the imaging apparatus according to (16), further comprising a function of acquiring a result of photometry of external light and updating the target transmittance to a transmittance according to the result of photometry in a case where a preliminary imaging operation is detected while power of the imaging apparatus is turned off.

According to this aspect, in a case where the preliminary imaging operation is detected while power is turned off, the external light is measured by the photometry unit, and the target transmittance of the variable ND filter is updated on the basis of the result of photometry. Thereby, it is possible to set a more appropriate transmittance than that at the time of power on. In addition, since photometry is performed in a case where a preliminary imaging operation is detected, power consumption can be suppressed.

(18) The finder display control program of the imaging apparatus according to (17), further comprising a function of determining whether or not the target transmittance can be updated in a case where the preliminary imaging operation is detected, where in a case where it is determined that the target transmittance can be updated, the target transmittance is updated to a transmittance according to the result of photometry of the external light.

According to this aspect, in a case where the preliminary imaging operation is detected while power is turned off, it is determined whether or not the target transmittance can be updated, and only in a case where the target transmittance can be updated, the target transmittance is updated. Thereby, the target transmittance can be appropriately updated.

(19) The finder display control program of the imaging apparatus according to (18), where it is determined whether or not the target transmittance can be updated, on the basis of the result of photometry of the external light.

According to this aspect, it is determined whether or not the target transmittance can be updated on the basis of the result of photometry of the photometry unit.

According to this invention, favorable visibility of a finder can be ensured from when power is turned on.

BRIEF DESCRIPTION OF THE DRAWINGS

FIG. 18 is a schematic configuration diagram showing an example of a single-lens reflex camera according to the present invention.

DESCRIPTION OF THE PREFERRED EMBODIMENTS

Hereinafter, preferred embodiments for carrying out the present invention will be described in detail with reference to the accompanying drawings.

First Embodiment

[Appearance Configuration]

Figure 1:
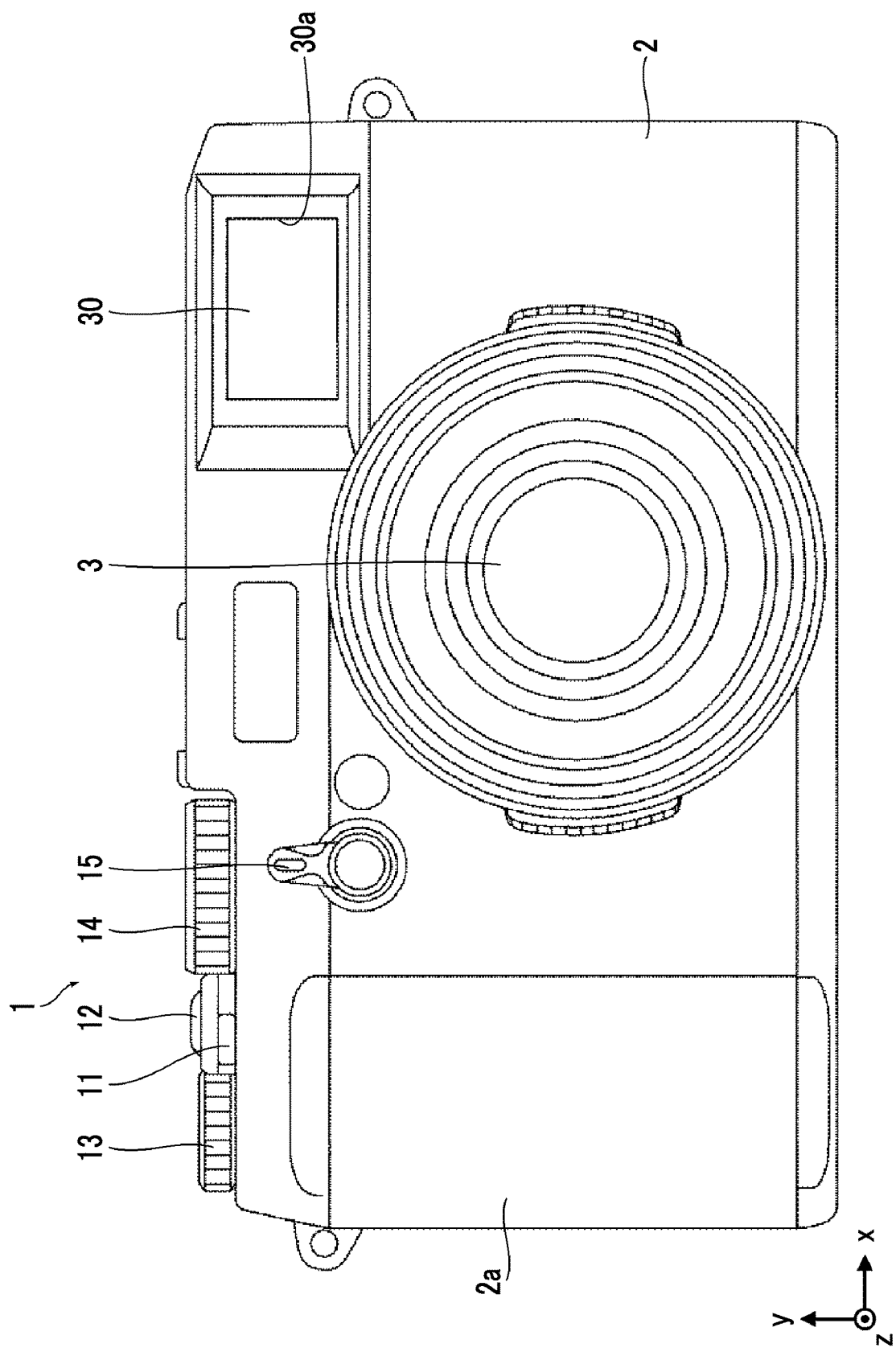
FIG. 1 is a front view showing an embodiment of a digital camera.
Figure 2:
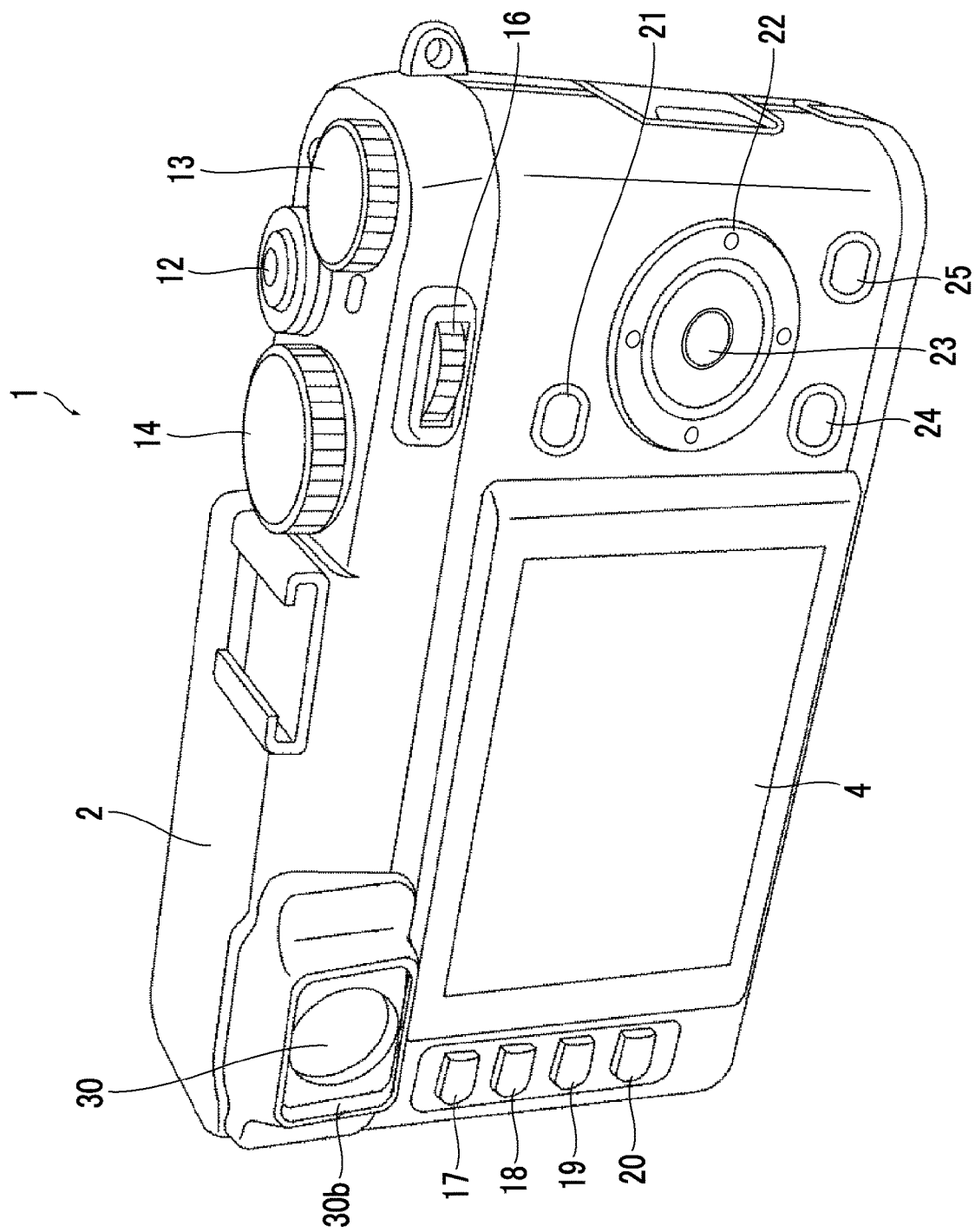
FIG. 2 is a rear perspective view of the digital camera shown in FIG. 1.

FIG. 1 is a front view showing an embodiment of a digital camera according to the present invention. FIG. 2 is a rear perspective view of the digital camera shown in FIG. 1.

The digital camera 1 is a lens-integrated digital camera in which an imaging lens 3 is integrally attached to a camera body 2. The digital camera 1 is an example of an imaging apparatus.

As shown in FIGS. 1 and 2, the digital camera 1 comprises an imaging lens 3, a viewfinder 30, a rear monitor 4, and the like on a camera body 2. Further, in the camera body 2, the digital camera 1 comprises, as operation members, a power lever 11, a shutter button 12, an exposure compensation dial 13, a shutter speed dial 14, a finder switching lever 15, a command dial 16, a view mode button 17, a reproduction button 18, an erase button 19, a function button 20, an AE/AF lock button 21, a selector button 22, an OK button 23, a menu button 24, a DISP/BACK button 25, and the like.

The camera body 2 has a flat rectangular box shape as a whole, and has a grip 2a as a grip at one end in the horizontal direction.

The imaging lens 3 is provided on the front surface of the camera body 2. The imaging lens 3 is composed of a single focus lens having a focus adjustment function.

The viewfinder 30 is composed of a hybrid viewfinder (HVF) that can be used by switching between both an optical viewfinder (OVF) and an electronic viewfinder (EVF). A finder window unit 30a of the viewfinder 30 is provided on the front surface of the camera body 2, and a finder eyepiece unit 30b of the viewfinder 30 is provided on the rear surface. Details of the viewfinder 30 will be described later.

The rear monitor 4 is provided on the rear surface of the camera body 2. The rear monitor 4 is composed of, for example, a liquid crystal display (LCD).

The power lever 11 is a lever for turning on and off the power of the digital camera 1. The power lever 11 is provided on the upper surface of the camera body 2. The power lever 11 swings around the shutter button 12 to selectively move between an on position and an off position. In a case where the power lever 11 is set to the ON position, the power of the digital camera 1 is turned on. In a case where the power lever 11 is moved to the off position, the power of the digital camera 1 is turned off. The power lever 11 is an example of a power operation unit.

The shutter button 12 is a button for issuing an instruction of imaging. The shutter button 12 is provided on the upper surface of the camera body 2. The shutter button 12 is composed of a two-stroke type push button that can be pressed halfway and pressed fully. In a case where the shutter button 12 is pressed halfway, an instruction of preparation for imaging is issued. Further, in a case where the shutter button 12 is pressed fully, an instruction of execution of imaging is issued.

The exposure compensation dial 13 is a dial for setting an exposure compensation amount. The exposure compensation dial 13 is provided on the upper surface of the camera body 2.

The shutter speed dial 14 is a dial for setting a shutter speed. The shutter speed dial 14 is provided on the upper surface of the camera body 2.

The finder switching lever 15 is a lever that switches the mode of the viewfinder 30. The finder switching lever 15 is provided on the front surface of the camera body 2. The finder switching lever 15 is swung to switch the mode of the viewfinder 30. Specifically, each time the finder switching lever 15 is swung, the viewfinder 30 alternately switches between OVF and EVF.

The command dial 16 is a rotary operation member that can be rotated clockwise and counterclockwise, and is provided on the rear surface of the camera body 2. A function corresponding to the mode of the digital camera 1 is assigned to the command dial 16. For example, in the imaging mode, the stop is adjusted, and in the reproduction mode, the image being reproduced is enlarged or reduced.

The view mode button 17 is a button for switching between display performed by the viewfinder 30 and display performed by the rear monitor 4. The view mode button 17 is provided on the rear surface of the camera body 2. Each time the view mode button 17 is pressed, the display on the viewfinder 30 and the display on the rear monitor 4 are alternately switched. In a case where the display performed by the viewfinder 30 is selected, the display performed by the rear monitor 4 is turned off. On the other hand, in a case where the display on the rear monitor 4 is selected, the display on the viewfinder 30 is turned off.

The reproduction button 18 is a button for issuing an instruction of switching from the imaging mode to the reproduction mode. The reproduction button 18 is provided on the rear surface of the camera body 2. In a case where the reproduction button 18 is pressed while the camera is set to the imaging mode, the mode of the digital camera 1 is switched to the reproduction mode. It should be noted that in a case where the shutter button 12 is pressed in the reproduction mode, the mode of the digital camera 1 is switched to the imaging mode.

The erase button 19 is a button for issuing an instruction of deletion of an image being reproduced. The erase button 19 is provided on the rear surface of the camera body 2.

The function button 20 is a button for operating a function assigned in advance. The function button 20 is provided on the rear surface of the camera body 2.

The AE/AF lock button 21 is a button for issuing an instruction of lock of automatic exposure (AE) and auto focus (AF). The AE/AF lock button 21 is provided on the rear surface of the camera body 2. While the AE/AF lock button 21 is pressed, the AE and AF are locked.

The selector button 22 is a button that can be pressed in four directions: up, down, left, and right directions. The selector button 22 is provided on the rear surface of the camera body 2. A function corresponding to the state of the digital camera 1 is assigned to each direction of the selector button 22. For example, in a case of performing various settings using the rear monitor 4, a function of moving a cursor displayed on the screen is assigned. In the reproduction mode, the functions of frame advance and frame return are assigned to the left and right buttons.

The OK button 23 is a button for issuing an instruction of OK in a case of performing various settings and the like. The OK button 23 is disposed at the center of the selector button 22.

The menu button 24 is a button for issuing an instruction of the loading of the menu screen. The menu button 24 is provided on the rear surface of the camera body 2. In a case where the menu button 24 is pressed, a menu screen for performing various settings is displayed on the rear monitor 4.

The DISP/BACK button 25 is a button (a function as a DISP button) for issuing an instruction of switching of the contents displayed on the rear monitor 4 and the viewfinder 30. The DISP/BACK button 25 is a button (function as a BACK button) for instructing the digital camera 1 to return to the previous state in a case of performing various settings and the like. The DISP/BACK button 25 is provided on the rear surface of the camera body 2. The function as the DISP button and the function as the BACK button are automatically switched in accordance with the state of the digital camera 1.

[Viewfinder]

«Viewfinder Configuration»

Figure 3:
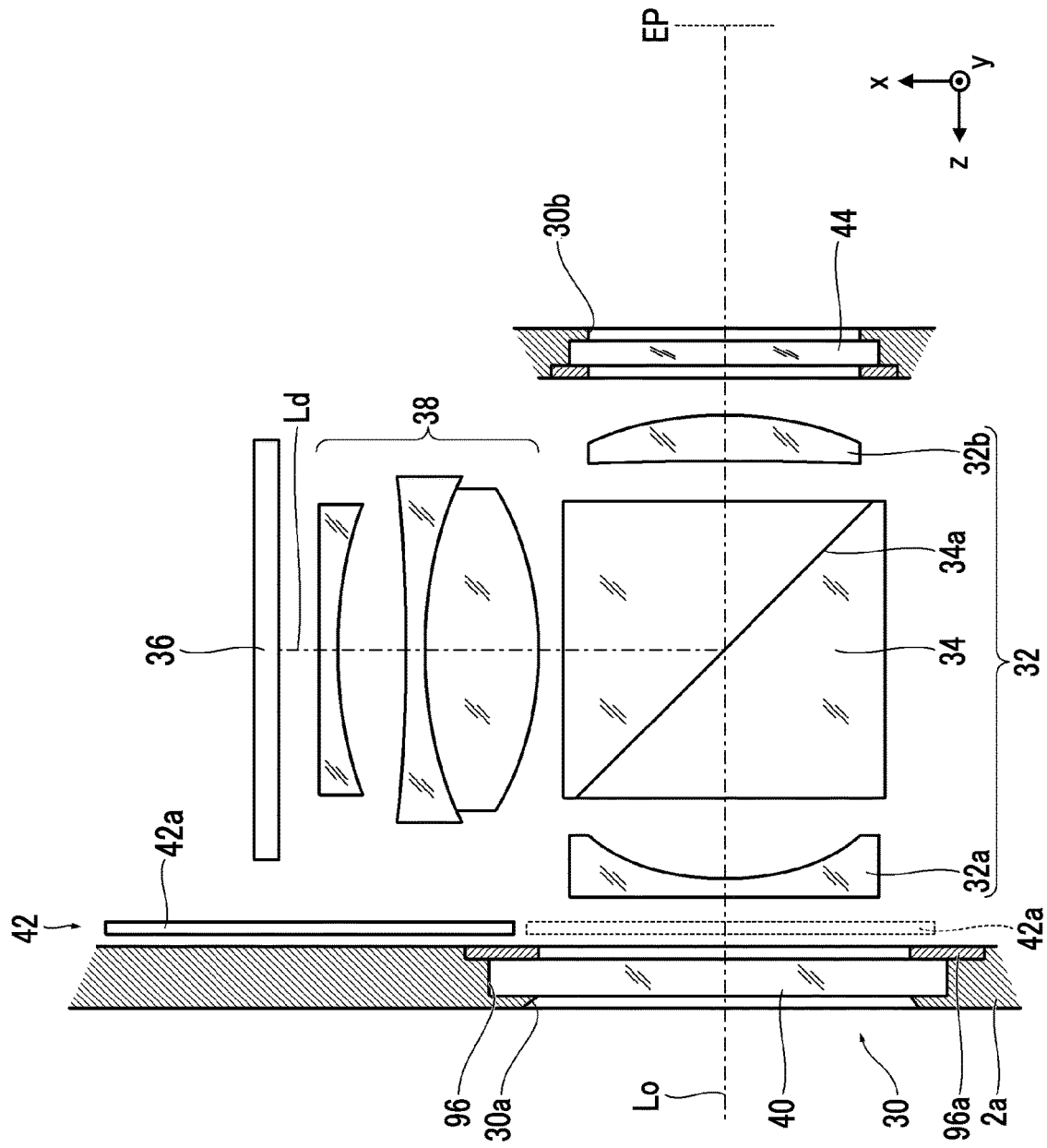
FIG. 3 is a cross-sectional plan view showing a configuration of a viewfinder.

FIG. 3 is a cross-sectional plan view showing the configuration of the viewfinder.

As shown in the drawing, the viewfinder 30 comprises an observation optical system 32, a beam splitter 34, a finder LCD 36, a target lens 38, a variable ND filter 40, a finder shutter 42, and a cover glass 44.

<Observation Optical System>

The observation optical system 32 is an optical system for observing an optical image of a subject, and includes an optical system independent of the imaging lens 3. The observation optical system 32 is composed of an observation optical system of a reverse Galileo finder, and comprises an objective lens 32a having a negative refractive power and an eyepiece lens 32b having a positive refractive power. The finder window unit 30a and the finder eyepiece unit 30b of the viewfinder 30 are disposed on the optical axis Lo of the observation optical system 32.

<Beam Splitter>

The beam splitter 34 is composed of a prism type beam splitter in which two right-angle prisms are cemented, and has a semi-transparent film 34a on an inner slope thereof. The semi-transparent film 34a divides the light, which is perpendicularly incident into the incident surface of the beam splitter 34, into transmitted light and reflected light. The beam splitter 34 is an example of a superimposing optical element. The beam splitter 34 is disposed on the optical axis Lo of the observation optical system 32, and is disposed between the objective lens 32a and the eyepiece lens 32b.

<Finder LCD>

A finder liquid crystal display (LCD) 36 displays information to be superimposed on an optical image of a subject observed through the observation optical system 32 in a case where the viewfinder 30 is used as an OVF. The finder LCD 36 displays an image captured by the image sensor 52 (refer to FIG. 6) in real time in a case where the viewfinder 30 is used as an EVF. The finder LCD 36 is an example of a display device. The finder LCD 36 is composed of, for example, a transmissive LCD comprising a backlight. The finder LCD 36 is disposed on the optical axis Ld. The optical axis Ld is an optical axis that passes through the semi-transparent film 34a of the beam splitter 34 and is orthogonal to the optical axis Lo of the observation optical system 32.

<Target Lens>

The target lens 38 is disposed in an optical path between the finder LCD 36 and the beam splitter 34, and guides light from the finder LCD 36 to the eyepiece lens 32b.

<Variable ND Filter>

The variable neutral density (ND) filter 40 is provided in the finder window unit 30a, and adjusts the light amount of light incident into the observation optical system 32 by changing the transmittance (density) thereof.

In the digital camera 1 of the present embodiment, the variable ND filter 40 is composed of an electronic variable ND filter. The electronic variable ND filter is an ND filter that is able to electronically control the transmittance (density). In particular, in the digital camera 1 according to the present embodiment, as an electronic variable ND filter, the variable ND filter 40 is composed of an electrochromic element.

An electrochromic element (EC element) is an optical element that utilizes an electrochromic phenomenon in which the color of a substance is reversibly changed by an electrochemical oxidation-reduction reaction caused by application of a voltage. The electrochromic element has a characteristic that the operating speed is slow since the electrochromic element utilizes a chemical reaction.

<Finder Shutter>

The finder shutter 42 opens and closes the finder window unit 30a. The finder shutter 42 comprises a finder shutter base plate 42a capable of blocking the opening of the finder window unit 30a, and a finder shutter driving unit 42b (refer to FIG. 6) for driving the finder shutter base plate 42a. The finder shutter base plate 42a is driven by a finder shutter driving unit 42b, and slides between a closed position (a position shown by a dashed line in FIG. 3) and an open position (a position shown by a solid line in FIG. 3), thereby opening and closing the finder window unit 30a.

In a case where the finder shutter base plate 42a moves to the closed position, the opening of the finder window unit 30a is closed by the finder shutter base plate 42a, and the observation optical system 32 is blocked from light. On the other hand, in a case where the finder shutter base plate 42a moves to the open position, the finder shutter base plate 42a is retracted from the optical path of the observation optical system 32, and the optical image of the subject can be observed through the observation optical system 32.

<Cover Glass>

The cover glass 44 is provided on the finder eyepiece unit 30b. The cover glass 44 is composed of a transparent glass plate.

«Viewfinder Function»

The viewfinder 30 configured as described above can be used by switching between an optical viewfinder (OVF) and an electronic viewfinder (EVF) by opening and closing the finder shutter 42.

<In a Case of Use as OVF>

In a case of using as an OVF, the finder shutter 42 is opened. In a case where the finder shutter 42 is opened, light from the subject is incident from the finder window unit 30a. The light incident from the finder window unit 30a is sequentially transmitted through the variable ND filter 40, the objective lens 32a, the beam splitter 34, the eyepiece lens 32b, and the cover glass 44, and is incident on the eye point EP. Thereby, the optical image of the subject is observed at the eye point EP.

In a case where an image is displayed on the finder LCD 36 with the finder shutter 42 opened, light from the finder LCD 36 is incident into the beam splitter 34 through the target lens 38. The light incident into the beam splitter 34 is reflected by the semi-transparent film 34a, and is incident on the eye point EP through the eyepiece lens 32b. Thereby, at the eye point EP, the display of the finder LCD 36 is observed while being superimposed on the optical image of the subject by the observation optical system 32.

Figure 4:
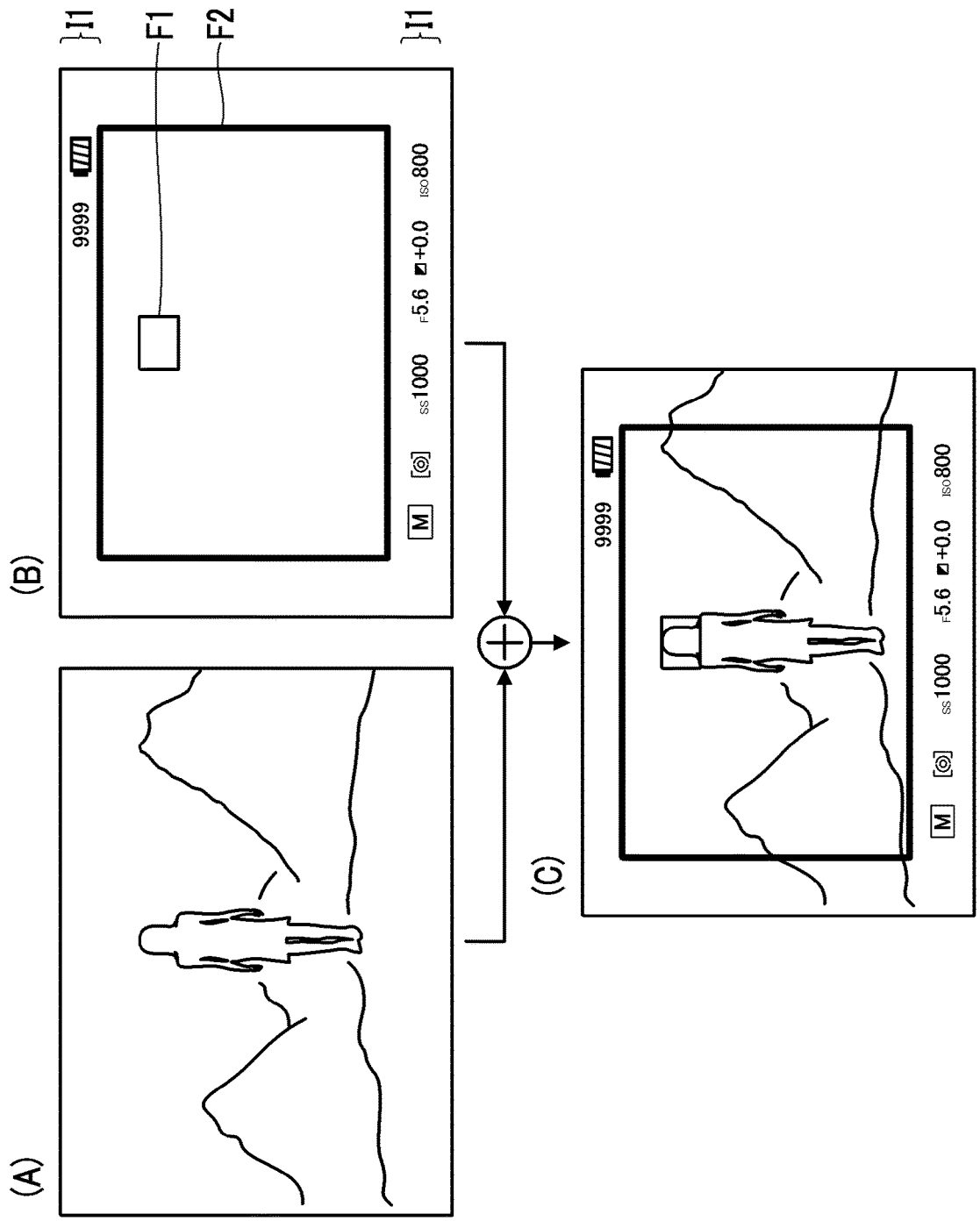
FIG. 4 is a conceptual diagram of OVF superimposed display.

FIG. 4 is a conceptual diagram of OVF superimposed display.

FIG. 4(A) is an OVF screen observed from the finder eyepiece unit 30b through the observation optical system 32. FIG. 4(B) shows a screen of the finder LCD 36. In the example shown in the drawing, an example is shown in which a visual field frame F1, an AF frame F2, and imaging information I1 are displayed on the finder LCD 36. The visual field frame F1 is a frame indicating a imaging range. The AF frame F2 is a frame indicating an area to be in focus during auto focus (AF). The imaging information I1 includes an imaging mode, an exposure mode, a shutter speed, a stop value, an exposure compensation amount, a sensitivity, the number of images that can be captured, a remaining battery capacity, and the like. The imaging information I1 is displayed in a margin around the visual field frame F1. FIG. 4(C) shows an OVF screen on which the display of the finder LCD 36 is superimposed. As shown in FIG. 4(C), in a case where an image is displayed on the finder LCD 36 with the finder shutter 42 opened, the image displayed on the finder LCD 36 is displayed on the OVF screen. In a case where the display of the finder LCD 36 is turned off, only the optical image is observed as shown in FIG. 4(A).

<In Case of Use as EVF>

In a case of using the viewfinder 30 as an EVF, the finder shutter 42 is closed. In a case where an image is displayed on the finder LCD 36 with the finder shutter 42 closed, only the display on the finder LCD 36 is observed at the eye point EP. Therefore, in a case where the finder shutter 42 is closed and the image captured by the image sensor 52 is displayed on the finder LCD 36 in real time, the viewfinder 30 can be used as an EVF.

<Switching Between OVF and EVF>

Figure 5:
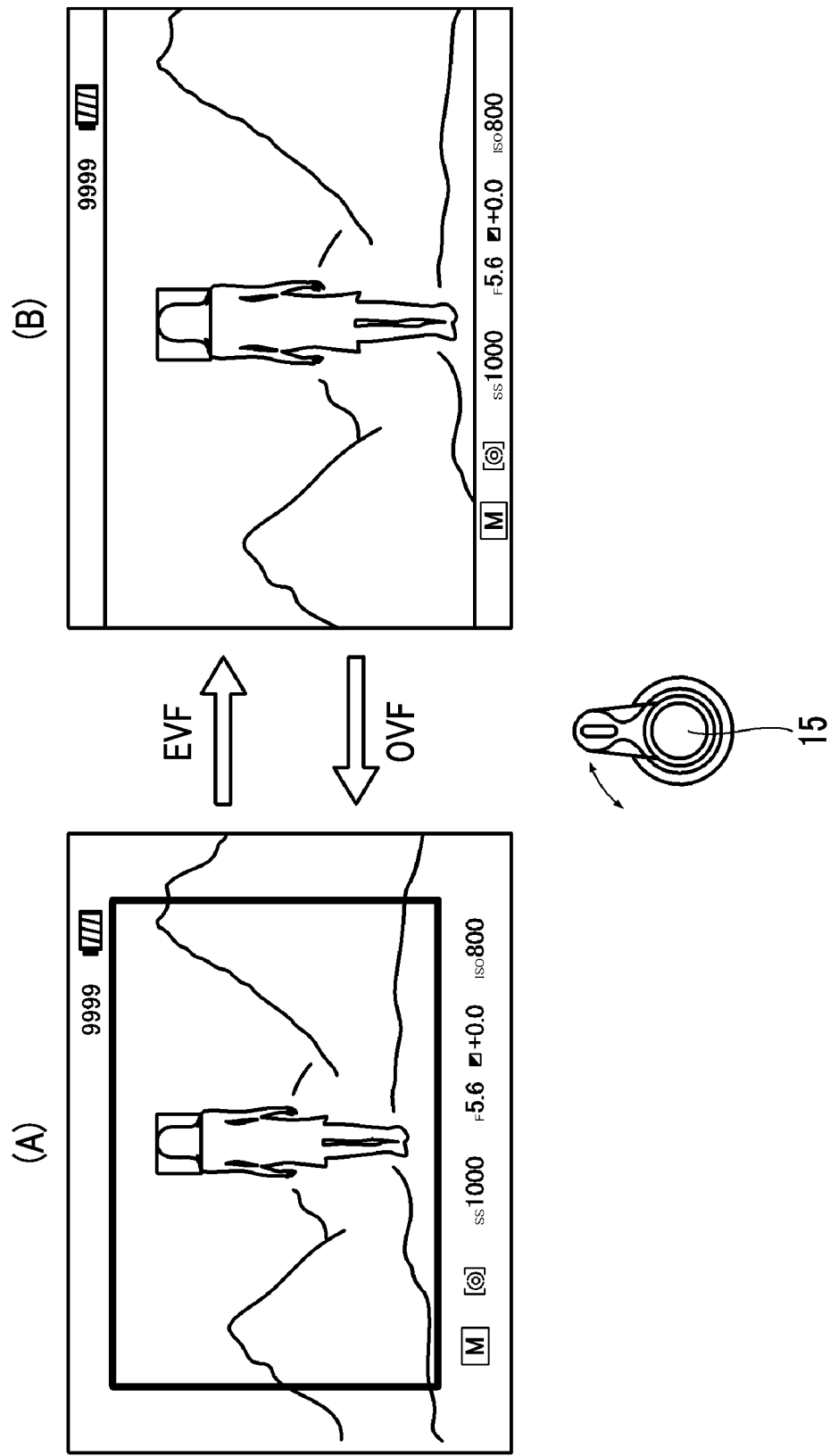
FIG. 5 is a conceptual diagram of switching between OVF and EVF.

FIG. 5 is a conceptual diagram of switching between OVF and EVF.

FIG. 5(A) shows an OVF screen, and FIG. 5(B) shows an EVF screen. Switching between the OVF and the EVF is performed by the finder switching lever 15, and the OVF and the EVF are alternately switched each time the finder switching lever 15 is swung.

[Electrical Configuration of Digital Camera]

Figure 6:
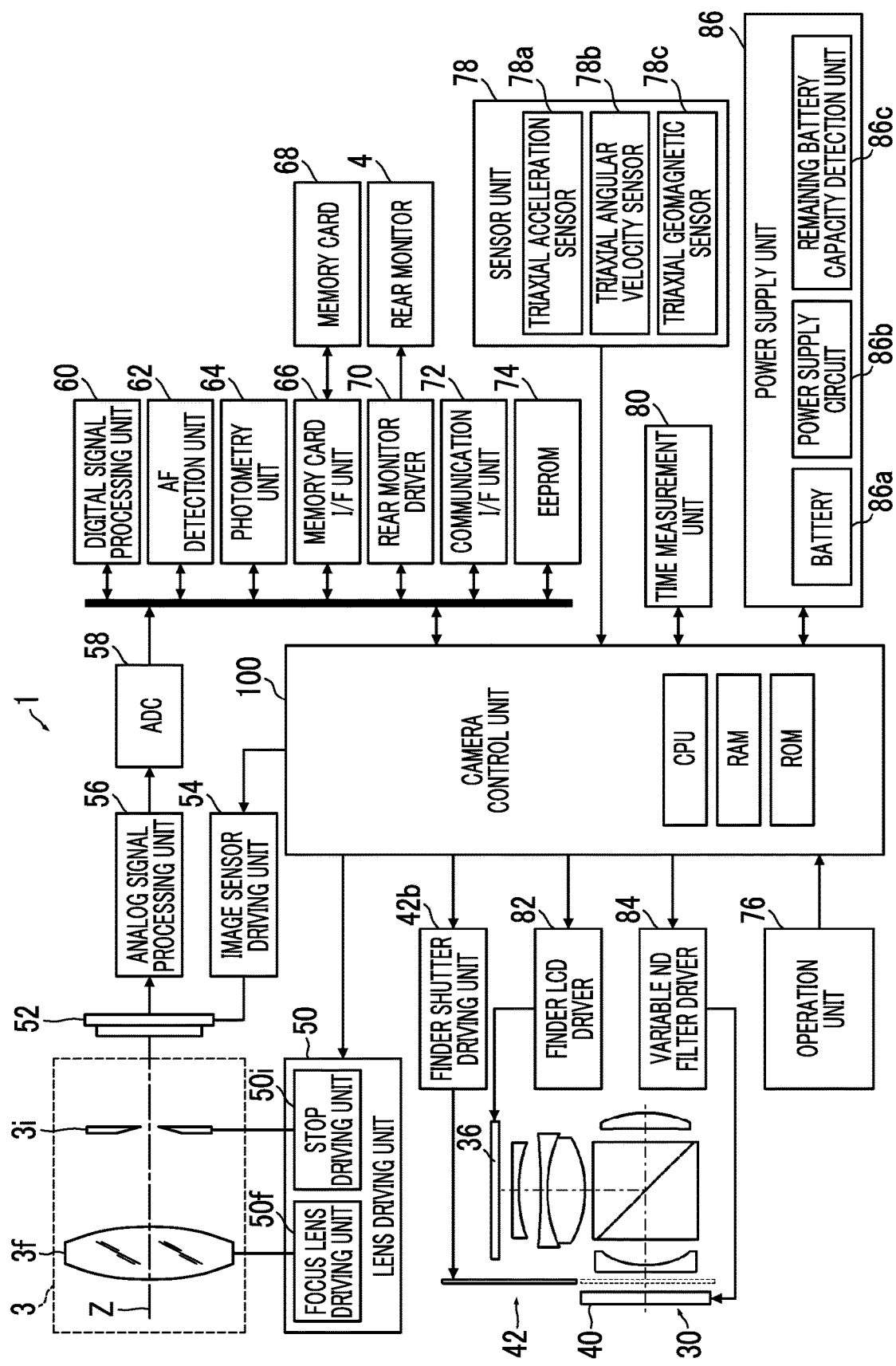
FIG. 6 is a diagram showing an electrical schematic configuration of the digital camera.

FIG. 6 is a diagram showing an electrical schematic configuration of the digital camera.

As shown in the drawing, the digital camera 1 comprises an imaging lens 3, a lens driving unit 50, an image sensor 52, an image sensor driving unit 54, an analog signal processing unit 56, an analog-to-digital converter (ADC) 58, a digital signal processing unit 60, an AF detection unit 62, a photometry unit 64, a memory card interface (I/F) unit 66, a memory card 68, a rear monitor 4, a rear monitor driver 70, a communication interface (I/F) unit 72, an electrically erasable programmable read-only memory (EEPROM) 74, an operation unit 76, a sensor unit 78, a time measurement unit 80, a finder shutter 42, a finder LCD 36, a finder LCD driver 82, a variable ND filter 40, a variable ND filter driver 84, a power supply unit 86, a camera control unit 100, and the like.

«Imaging Lens and Lens Driving Unit»

The imaging lens 3 is configured by combining a plurality of lenses. The imaging lens 3 has a focus adjustment mechanism, and the focus is adjusted by moving a part of the lens (focus lens) 3f back and forth along the optical axis Z. Further, the imaging lens 3 comprises a stop 3i, and the light amount is adjusted by adjusting the opening amount of the stop 3i. The stop 3i is composed of, for example, an iris stop.

The lens driving unit 50 comprises a focus lens driving unit 50f that drives the focus lens 3f and a stop driving unit 50i that drives the stop 3i.

The focus lens driving unit 50f moves the focus lens 3f back and forth along the optical axis Z. The focus lens driving unit 50f comprises an actuator such as a motor and a driving circuit therefor. The focus lens driving unit 50f is controlled by the camera control unit 100. The camera control unit 100 controls the focus lens driving unit 50f, thereby controlling the movement of the focus lens 3f.

The stop driving unit 50i enlarges or reduces the opening portion of the stop 3i. The stop driving unit 50i comprises an actuator such as a motor and a driving circuit thereof. The stop driving unit 50i is controlled by the camera control unit 100. The camera control unit 100 controls the stop driving unit 50i, thereby controlling the opening amount of the stop 3i.

«Image Sensor and Image Sensor Driving Unit»

The image sensor 52 captures an image of a subject through the imaging lens 3. The image sensor 52 is composed of a solid-state imaging element such as a charged coupled device (CCD) and a complementary metal oxide semiconductor (CMOS).

The image sensor driving unit 54 causes the image sensor 52 to capture an image by driving the image sensor 52. The image sensor driving unit 54 is controlled by the camera control unit 100. The camera control unit 100 controls the image sensor driving unit 54, thereby controlling the imaging by the image sensor 52.

«Analog Signal Processing Unit and Analog-to-Digital Converter»

The analog signal processing unit 56 captures an analog image signal for each pixel output from the image sensor 52 and performs predetermined signal processing such as correlated double sampling processing and amplification processing.

An analog-to-digital converter (ADC) 58 converts an analog image signal, which is output from the analog signal processing unit 56, into a digital image signal and outputs the digital image signal.

«Digital Signal Processing Unit»

The digital signal processing unit 60 captures a digital image signal, which is output from the analog-to-digital converter 58, and performs predetermined signal processing such as gradation conversion processing, white balance correction processing, gamma correction processing, synchronization processing, and YC conversion processing, thereby generating image data.

«AF Detection Unit»

The AF detection unit 62 captures a digital image signal, which is output from the analog-to-digital converter 58, and calculates information about a focus evaluation value necessary for auto focus (AF) control in a contrast method.

«Photometry Unit»

The photometry unit 64 captures a digital image signal, which is output from the analog-to-digital converter 58, and detects the brightness (luminance) of the subject.

«Memory Card Interface Unit and Memory Card»

The memory card interface unit 66 reads and writes data from and to a memory card 68 inserted in a card slot.

«Rear Monitor and Rear Monitor Driver»

The rear monitor 4 is used not only for reproducing a captured image, but also as a setting screen for various settings. The rear monitor 4 is used as a live view monitor in accordance with a user's selection. That is, in a case where the use of the rear monitor 4 is selected by the view mode button 17, the image captured by the image sensor 52 is displayed on the rear monitor 4 in real time. Thus, the rear monitor 4 is used as a live view monitor.

The display on the rear monitor 4 is controlled by the camera control unit 100. The camera control unit 100 controls the display on the rear monitor 4 through the rear monitor driver 70.

«Communication Interface Unit»

The communication interface unit 72 communicates with an external device in a prescribed communication format. The communication is controlled by the camera control unit 100.

«EEPROM»

The EEPROM 74 is a non-volatile memory that can be additionally written, and stores data necessary for controlling the digital camera 1 and the like. The EEPROM 74 is an example of a scheduled-imaging image information storage unit, and stores information of a scheduled-imaging place and scheduled-imaging information.

«Operation Unit»

The operation unit 76 outputs a signal to the camera control unit 100 in accordance with an operation of each operation member (such as the power lever 11, the shutter button 12, the exposure compensation dial 13, the shutter speed dial 14, the finder switching lever 15, the command dial 16, the view mode button 17, the reproduction button 18, the erase button 19, the function button 20, the AE/AF lock button 21, the selector button 22, the OK button 23, the menu button 24, and the DISP/BACK button 25) provided on the camera body 2.

«Sensor Unit»

The sensor unit 78 detects the movement of the digital camera 1, the current position, and the like. The sensor unit 78 comprises a triaxial acceleration sensor 78a, a triaxial angular velocity sensor 78b, and a triaxial geomagnetic sensor 78c.

The triaxial acceleration sensor 78a detects the acceleration of the digital camera 1 in the triaxial directions. The triaxial angular velocity sensor 78b detects the angular velocity of the digital camera 1 around three axes. The triaxial geomagnetic sensor 78c detects the geomagnetism of the digital camera 1 in the triaxial directions, thereby detecting the orientation thereof.

Here, the three axes (x axis, y axis, z axis) are set as follows on the basis of the light receiving surface of the image sensor 52. That is, the horizontal axis passing through the center of the light receiving surface of the image sensor 52 is set as the x axis, and the vertical axis passing through the center of the light receiving surface of the image sensor 52 is set as the y axis. An axis passing through the center of the light receiving surface of the image sensor 52 and perpendicular to the light receiving surface is set as a z axis. The x, y, and z axes are orthogonal to each other.

The image sensor 52 has a horizontally long aspect ratio (for example, horizontal:vertical=3:2), and the long side thereof is set parallel to the x axis and the short side thereof is set parallel to the y axis. In the digital camera 1, the bottom surface of the camera body 2 is set parallel to the x axis. In the digital camera 1, the optical axis Z of the imaging lens 3 coincides with the z axis.

The imaging orientation and the imaging attitude of the digital camera 1 are obtained on the basis of the outputs of the triaxial acceleration sensor 78*a*, the triaxial angular velocity sensor 78*b*, and the triaxial geomagnetic sensor 78*c*. That is, the orientation (imaging orientation) to which the light receiving surface of the image sensor 52 faces and the attitude (imaging attitude) of the image sensor 52 based on the horizontal and vertical directions are obtained. The imaging attitude is specified by, for example, a rotation angle around the x axis, a rotation angle around the y axis, and a rotation angle around the z axis of the image sensor 52 based on the horizontal and vertical directions. Thereby, attitudes such as imaging at the vertical position, imaging at the horizontal position, and the tilt can be specified. As described above, the sensor unit 78 is able to detect the imaging posture, and thus functions as a level.

«Time Measurement Unit»

The time measurement unit 80 has a calendar function and a clock function, and measures the current date and time. That is, the current date and time are measured. Information about the current date and time measured by the time measurement unit 80 is output to the camera control unit 100.

«Finder Shutter»

The finder shutter 42 comprises the finder shutter base plate 42*a* and a finder shutter driving unit 42*b* that drives the finder shutter base plate 42*a*. The finder shutter driving unit 42*b* comprises an actuator such as a motor and a driving circuit therefor. The finder shutter driving unit 42*b* is controlled by the camera control unit 100. The camera control unit 100 controls the finder shutter driving unit 42*b*, thereby controlling the opening and closing of the finder window unit 30*a* through the finder shutter 42.

«Finder LCD and Finder LCD Driver»

The display of the finder LCD 36 is controlled by the camera control unit 100. The camera control unit 100 controls the display on the finder LCD 36 through the finder LCD driver 82.

It should be noted that the display control of the finder LCD 36 performed by the camera control unit 100 includes control of the light amount of the finder LCD 36. This point will be described later.

«Variable ND Filter and Variable ND Filter Driver»

The transmittance (density) of the variable ND filter 40 is controlled by the camera control unit 100 through the variable ND filter driver 84. The transmittance of the variable ND filter 40 is switched in accordance with the brightness of external light. The switching of the transmittance will be described later.

«Power Supply Unit»

The power supply unit 86 includes a battery 86*a* as a power supply, a power supply circuit 86*b* that supplies power from the battery 86*a* to each unit, and a remaining battery capacity detection circuit 86*c* that detects the remaining capacity of the battery 86*a*. The remaining battery capacity detection circuit 86*c* is an example of a remaining battery capacity detection unit. Information about the remaining battery capacity detected by the remaining battery capacity detection circuit 86*c* is output to the camera control unit 100.

«Camera Control Unit»

The camera control unit 100 is a control unit that controls the overall operation of the digital camera 1. The camera control unit 100 is composed of, for example, a microcomputer comprising a central processing unit (CPU), a random access memory (RAM), and a read only memory (ROM). Thus, various functions are realized by executing a predetermined program (such as a finder display control program). The medium, in which the predetermined program (such as a finder display control program) is stored, may be a non-transitory and computer-readable recording medium such as a hard disk, a compact disk (CD), a digital versatile disk (DVD), and various semiconductor memories.

Figure 7:
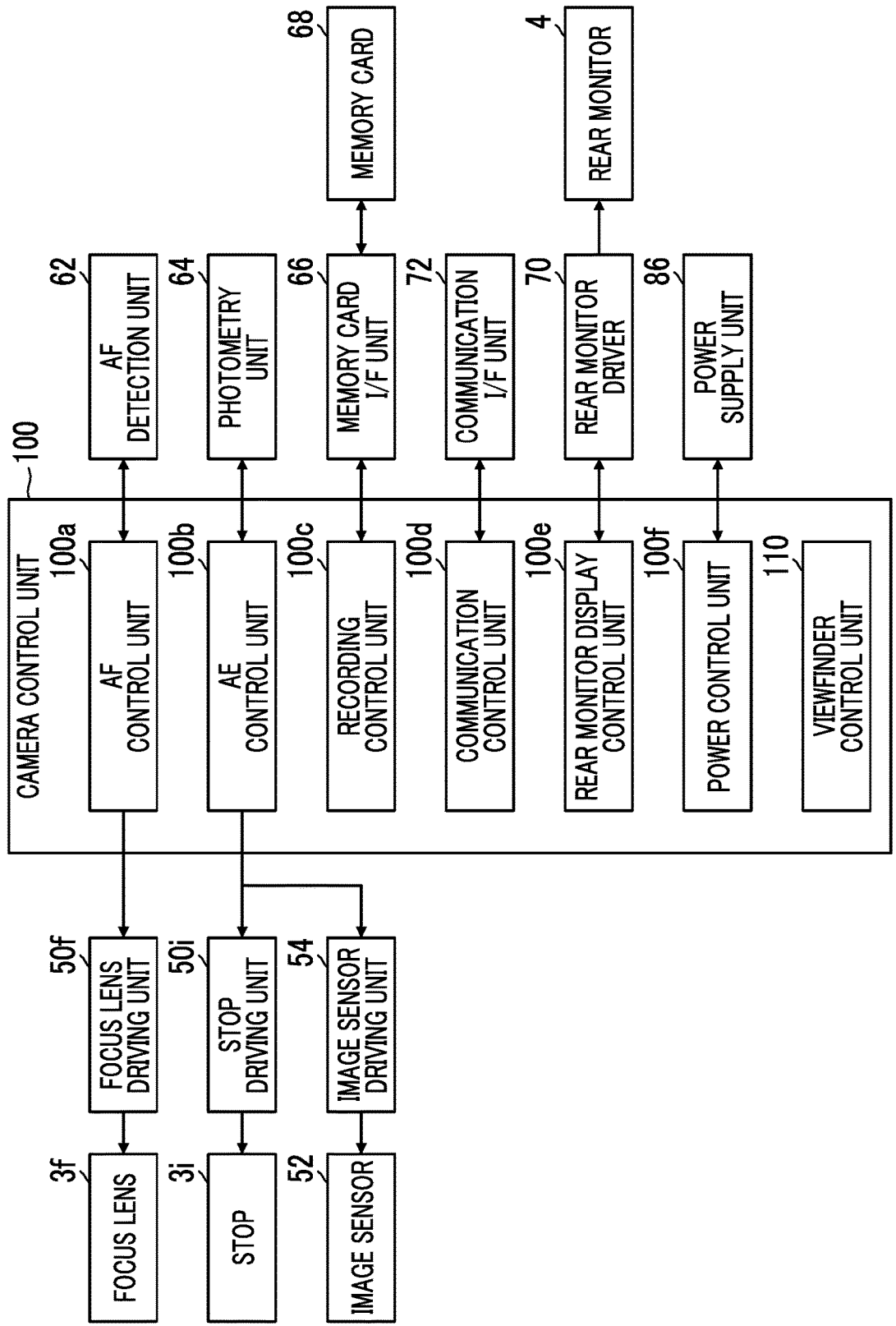
FIG. 7 is a block diagram of main functions realized by a camera control unit.

FIG. 7 is a block diagram of main functions realized by the camera control unit.

As shown in the drawing, the camera control unit 100 functions as an AF control unit 100*a*, an AE control unit 100*b*, a recording control unit 100*c*, a communication control unit 100*d*, a rear monitor display control unit 100*e*, a power control unit 100*f*, a viewfinder control unit 110, and the like.

<AF Control Unit>

The AF control unit 100*a* performs contrast-type auto focus (AF) control on the basis of the result of detection of the AF detection unit 62. The AF control unit 100*a* moves the focus lens 3*f* from the closest end to the infinity end, detects a position where the focus evaluation value is the maximum, and moves the focus lens 3*f* to the detected position.

<AE Control Unit>

The AE control unit 100*b* performs Automatic Exposure (AE) control for obtaining an appropriate exposure on the basis of the result of photometry of the photometry unit 64. The AE control unit 100*b* calculates an exposure value (EV) value on the basis of the result of photometry of the photometry unit 64. The AE control unit 100*b* determines a stop value and a shutter speed on the basis of the calculated EV value. The AE control unit 100*b* controls the stop 3*i* through the stop driving unit 50*i* such that the stop value becomes the determined stop value. In addition, the AE control unit 100*b* controls the image sensor 52 through the image sensor driving unit 54 such that the shutter speed becomes the determined shutter speed. That is, the exposure time of the image sensor 52 is controlled such that exposure is performed at the determined shutter speed.

<Recording Control Unit>

The recording control unit 100*c* controls writing and reading of data to and from the memory card 68 through the memory card interface unit 66. The image data obtained through imaging is recorded on a memory card 68 through a memory card interface unit 66. The image data recorded on the memory card 68 is read from the memory card 68 through the memory card interface unit 66.

<Communication Control Unit>

The communication control unit 100*d* controls communication with an external device through the communication interface unit 72.

<Rear Monitor Display Control Unit>

The rear monitor display control unit 100*e* controls display on the rear monitor 4. As described above, the rear monitor 4 is used not only for reproducing a captured image, but also as a setting screen for various settings. The rear monitor 4 is used as a live view monitor in accordance with a user's selection. The rear monitor display control unit 100*e* controls the display of the rear monitor 4 through the rear monitor driver 70.

<Power Control Unit>

The power control unit 100*f* controls the supply of power to each unit through the power supply unit 86. Specifically, the power supply circuit 86*b* (refer to FIG. 7) provided in the power supply unit 86 is controlled to control the supply of power to each unit. Also, information about the remaining battery capacity is acquired from the remaining battery capacity detection circuit 86*c* (refer to FIG. 7) provided in the power supply unit 86.

<Viewfinder Control Unit>

The viewfinder control unit 110 controls the viewfinder 30.

Figure 8:
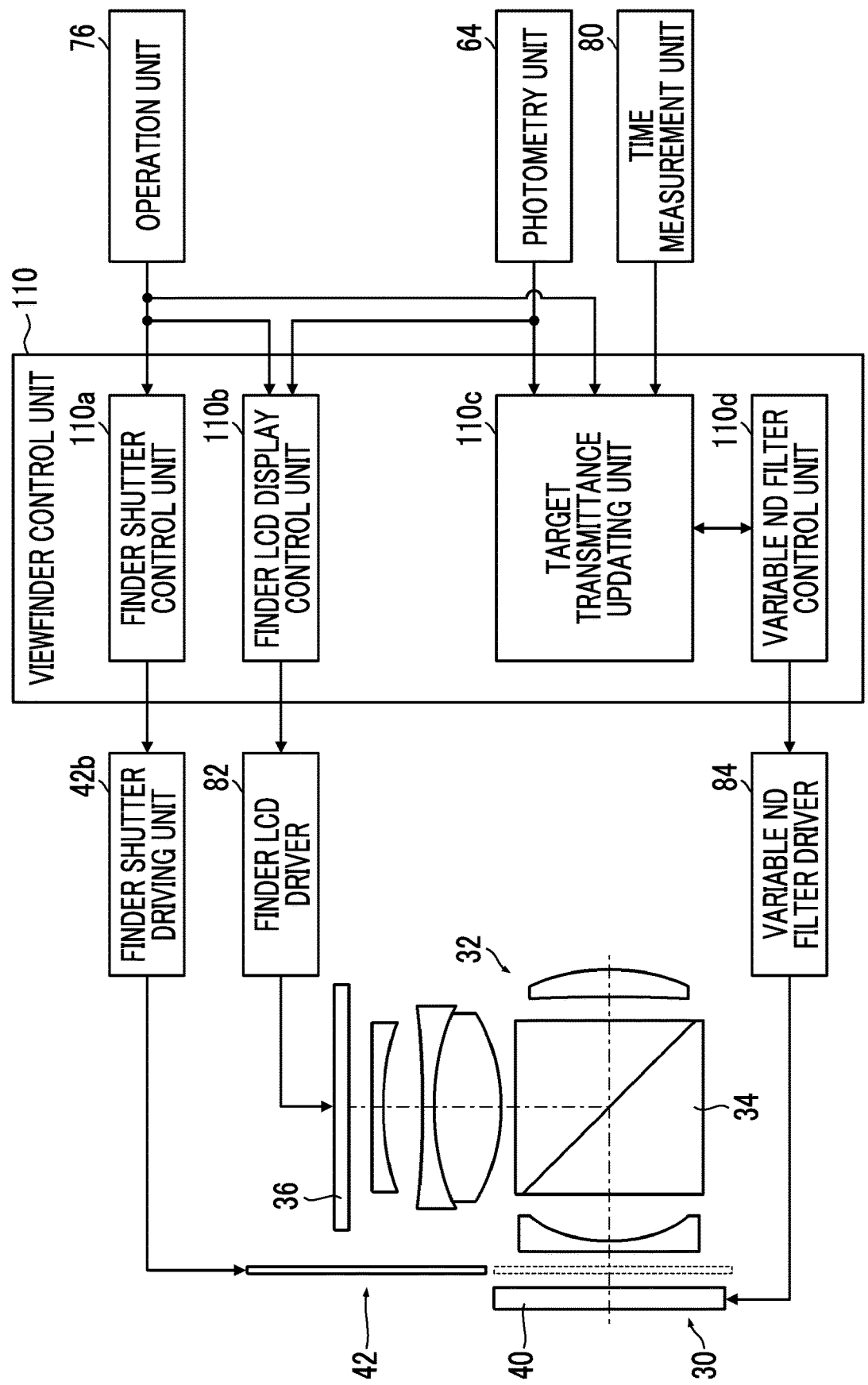
FIG. 8 is a block diagram of functions realized by a viewfinder control unit.

FIG. 8 is a block diagram of functions realized by the viewfinder control unit.

The viewfinder control unit 110 realizes functions such as a finder shutter control unit 110*a*, a finder LCD display control unit 110*b*, a target transmittance updating unit 110*c*, and a variable ND filter control unit 110*d*.

[Finder Shutter Control Unit]

The finder shutter control unit 110*a* controls the opening and closing of the finder shutter 42 on the basis of the switching operation between OVF and EVF by the finder switching lever 15. The finder shutter control unit 110*a* opens the finder shutter 42 in a case where the OVF is selected by the finder switching lever 15, and closes the finder shutter 42 in a case where the EVF is selected. The finder shutter control unit 110*a* controls opening and closing of the finder shutter 42 through the finder shutter driving unit 42*b*.

[Finder LCD Display Control Unit]

The finder LCD display control unit 110*b* controls the display of the finder LCD 36. In a case where OVF is selected, the finder LCD display control unit 110*b* causes the finder LCD 36 to display information such as a visual field frame, an AF frame, and imaging information (refer to FIG. 5(A)). On the other hand, in a case where EVF is selected, the finder LCD display control unit 110*b* causes the finder LCD 36 to display the image captured by the image sensor 52 in real time (refer to FIG. 5(B)).

Further, the finder LCD display control unit 110*b* controls the light amount of the finder LCD 36 on the basis of the result of photometry performed by the photometry unit 64. That is, the light amount of the finder LCD 36 is controlled in accordance with the brightness (luminance) of the subject.

The finder LCD display control unit 110*b* controls the driving of the backlight provided in the finder LCD 36, thereby controlling the light amount of the finder LCD 36. For example, the backlight application voltage is driven by pulse width modulation (PWM), thereby controlling the light amount of the finder LCD 36.

Figure 9:
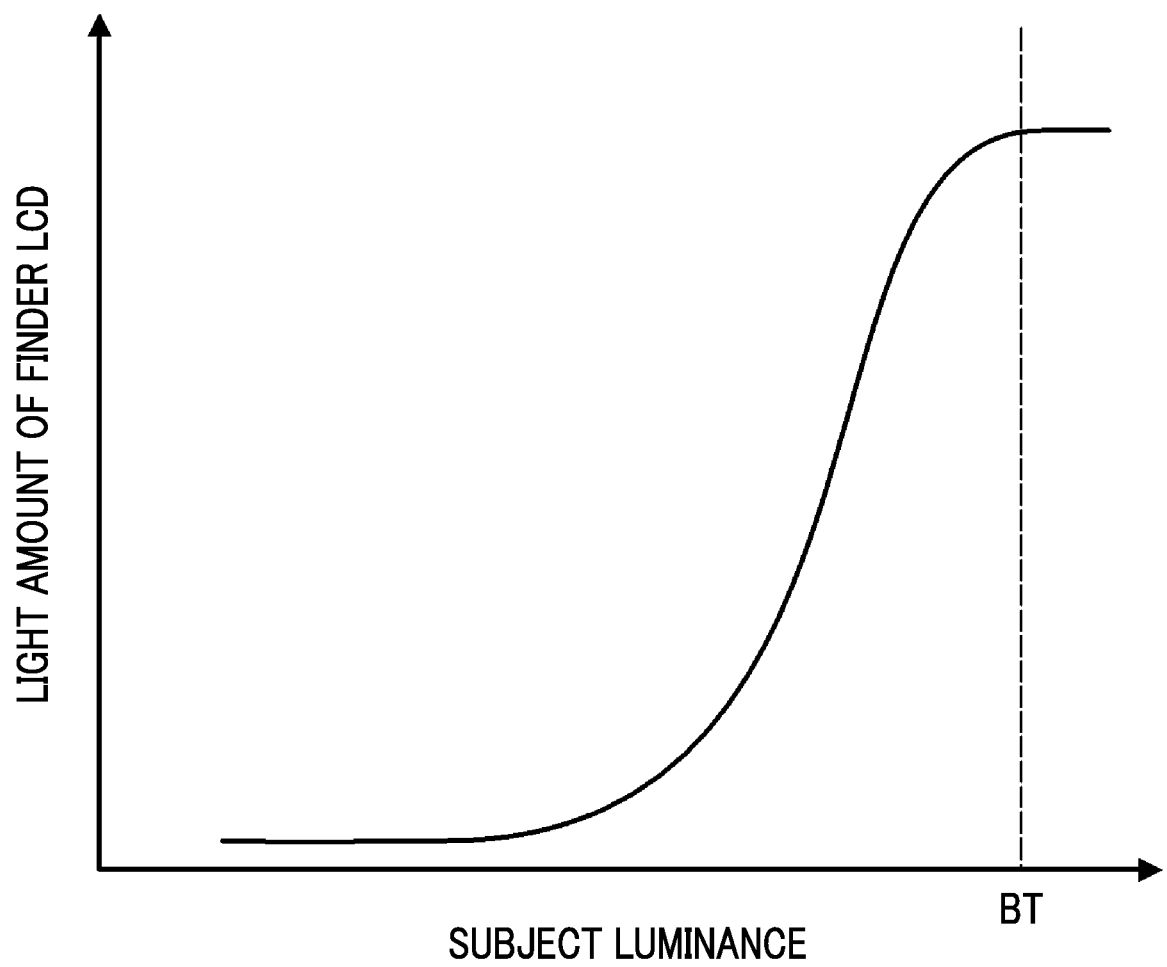
FIG. 9 is a graph showing the relationship between a brightness of a subject (subject luminance) and a light amount of a finder LCD.

FIG. 9 is a graph showing the relationship between the brightness of the subject (subject luminance) and the light amount of the finder LCD.

As shown in the drawing, the finder LCD display control unit 110*b* controls the light amount of the finder LCD 36 on the basis of the result of photometry (subject luminance) performed by the photometry unit 64. More specifically, driving of the backlight is controlled.

As described above, by controlling the light amount of the finder LCD 36 in accordance with the brightness of the subject, it is possible to constantly maintain favorable visibility of the display in the finder in a range from a bright environment to a dark environment.

(Target Transmittance Updating Unit)

The target transmittance updating unit 110*c* performs update processing of the target transmittance of the variable ND filter 40. The target transmittance of the variable ND filter 40 is determined as a transmittance that is necessary for the variable ND filter 40 at present. Therefore, in a case where the target transmittance is updated, the transmittance of the variable ND filter 40 is changed in accordance with the updated target transmittance.

The target transmittance updating unit 110*c* performs different update processing in accordance with the state of the power supply unit of the digital camera 1. That is, different update processing is performed in a case where power of the digital camera 1 is turned on and off.

(A) Update Processing of Target Transmittance in Case where Power of Digital Camera is Turned on In a case where power of the digital camera 1 is turned on, the target transmittance updating unit 110*c* updates the target transmittance of the variable ND filter 40 on the basis of the result of photometry performed by the photometry unit 64. Specifically, in a case where the brightness (luminance) of the subject measured by the photometry unit 64 is less than a predetermined threshold value BT, the transmittance of the variable ND filter 40 is set as a first transmittance $\tau 1$. In a case where the brightness is equal to or greater than the threshold value BT, the transmittance of the variable ND filter 40 is set as a second transmittance $\tau 2$. The second transmittance $\tau 2$ is a value lower than the first transmittance $\tau 1$ ($\tau 1 > \tau 2$). For example, the first transmittance $\tau 1$ is 100%, and the second transmittance $\tau 2$ is 80%.

As described above, in a case where power of the digital camera 1 is turned on, the target transmittance of the variable ND filter 40 is updated on the basis of the result of photometry performed by the photometry unit 64. As a result, the transmittance of the variable ND filter 40 is automatically reduced in a case where the surrounding environment has a certain brightness or higher. Thus, in a case where the OVF is used in a bright environment, the visibility of the display on the finder LCD 36 can be improved. In a case where the environment returns from a bright environment to a dark environment, the transmittance of the variable ND filter 40 is automatically increased. A bright optical image can be observed through OVF.

The threshold value BT is set in consideration of the visibility of the display in the finder. In a case where the light amount of the finder LCD 36 is controlled in accordance with the brightness of the subject, the light amount of the finder LCD 36 reaches an upper limit at a certain brightness (luminance). That is, it becomes impossible to increase the light amount further. The threshold value BT is set as the value of the brightness of the subject in a case where the light amount of the finder LCD 36 reaches the upper limit (refer to FIG. 9).

(B) Update Processing of Target Transmittance in Case where Digital Camera Power is Turned Off In a case where power of the digital camera 1 is turned off, the target transmittance updating unit 110*c* updates the target transmittance in time with a lapse of a certain period of time after power is turned off. That is, the target transmittance of the variable ND filter 40 is updated on the basis of the transmittance determined for each time zone. The certain period of time after power is turned off is an update prohibition period. The update prohibition period is specified in advance.

The digital camera 1 according to the present embodiment is divided into a daytime zone and a nighttime zone, and the transmittance to be set in each time zone is determined. The daytime zone is from 6:00 to 17:59. The nighttime zone is from 18:00 to 5:59. In the daytime zone, the transmittance to be set is the second transmittance $\tau 2$. In the nighttime zone, the transmittance to be set is the first transmittance $\tau 1$. As described above, the second transmittance $\tau 2$ is a value lower than the first transmittance $\tau 1$ ($\tau 1 > \tau 2$). During the daytime zone, the surrounding environment can be estimated to be bright. Therefore, the transmittance is set to be low. On the other hand, in the nighttime zone, the surrounding environment can be estimated to be dark. Therefore, the transmittance is set to be high.

The target transmittance updating unit 110c acquires the information about the current time from the time measurement unit 80 while power is turned off, and updates the target transmittance of the variable ND filter 40 on the basis of the information about the transmittance determined for each time zone. As a result, the visibility of the finder display can be satisfactorily ensured from when the power is turned on. For example, in a case where the use of the digital camera 1 is started during the daytime, the transmittance of the variable ND filter 40 has already been lowered. Therefore, even in a case where the digital camera 1 is used in a bright environment, favorable visibility from the start of use can be ensured. In addition, for example, in a case where the use of the digital camera 1 is started in the nighttime zone, a bright optical image can be observed since the transmittance of the variable ND filter 40 has already been increased.

[Variable ND Filter Control Unit]

The variable ND filter control unit 110d controls switching of the transmittance of the variable ND filter 40 through the variable ND filter driver 84. In a case where the target transmittance is updated, the variable ND filter control unit 110d changes the transmittance of the variable ND filter to the updated target transmittance.

[Operation of Digital Camera]

The digital camera 1 has a function of capturing an image and a function of reproducing an image. The function of capturing an image is activated by setting the mode of the digital camera 1 to an imaging mode. On the other hand, the function of reproducing an image is activated by setting the mode of the digital camera 1 to the reproduction mode. In a case where the power is turned on, the digital camera 1 is activated in an imaging mode. In a case where the reproduction button 18 is pressed in the state of the imaging mode, the digital camera 1 is switched to the reproduction mode. Further, in a case where the shutter button 12 is pressed in the reproduction mode, the digital camera 1 performs switching to the imaging mode.

«Imaging Mode»

The digital camera 1, which is set to the imaging mode, performs imaging processing in accordance with an operation of the shutter button 12. Specifically, each processing of AE and AF is performed in accordance with the half-pressing operation of the shutter button 12. Further, in response to a full-pressing operation of the shutter button 12, an image for recording is performed, and the obtained image is recorded on the memory card 68.

At the time of imaging, the user checks the imaging range and the like by using the viewfinder 30 or the rear monitor 4. Whether to use the viewfinder 30 or the rear monitor 4 depends on the setting of the view mode. The view mode is switched by the view mode button 17.

In a case where the rear monitor 4 is selected as the view mode, a live view is displayed on the rear monitor 4. That is, an image captured by the image sensor 52 through the imaging lens 3 is displayed on the rear monitor 4 in real time. The user views the display on the rear monitor 4 and checks the imaging range, the focus state, and the like.

On the other hand, in a case where the viewfinder 30 is selected as the view mode, the user checks the imaging range and the like by using the viewfinder 30.

Here, the viewfinder 30 can function as an OVF or an EVF. Whether the viewfinder 30 functions as an OVF or an EVF depends on the setting of the viewfinder 30. The setting of the viewfinder 30 is switched by the finder switching lever 15.

In a case where EVF is selected, a live view is displayed on the viewfinder 30 (refer to FIG. 5(B)). In such a case, the finder shutter 42 is closed, and the live view is displayed on the finder LCD 36. Thereby, the viewfinder 30 functions as an EVF. The user checks the imaging range, focus state, and the like by using the viewfinder 30 that functions as an EVF.

On the other hand, in a case where OVF is selected, the finder shutter 42 is opened. Thus, an optical image of the subject is observed from the finder eyepiece unit 30b through the observation optical system 32. In a case where OVF is selected, a visual field frame or the like is displayed on the finder LCD 36. Thus, the visual field frame and the like displayed on the finder LCD 36 are observed while being superimposed on the optical image of the subject obtained through the observation optical system 32.

In a case where the OVF is selected, the light amount of the finder LCD 36 is controlled on the basis of the result of photometry (subject luminance) of the photometry unit 64 in order to improve the visibility of the display in the finder. That is, the light amount is controlled to the light amount according to the result of photometry (refer to FIG. 9).

Further, the transmittance of the variable ND filter 40 is switched on the basis of the result of photometry performed by the photometry unit 64. The transmittance of the variable ND filter 40 is set as the first transmittance $\tau 1$ in a case where the result of photometry performed by the photometry unit 64 is less than the threshold value BT, and is set as the second transmittance $\tau 2$ in a case where the result of photometry is equal to or greater than the threshold value BT. Thereby, favorable visibility can constantly be ensured in a range from a bright environment to a dark environment.

«Reproduction Mode»

By setting the digital camera 1 to the reproduction mode, the image recorded on the memory card 68 can be reproduced.

In a case where the reproduction mode is set, the last recorded image is read from the memory card 68 and displayed on the rear monitor 4. The displayed image is advanced frame by frame, enlarged, reduced, or the like in accordance with the operation of the operation unit 76.

«Processing During Power Off»

As described above, in a case where power of the digital camera 1 is turned off, the target transmittance of the variable ND filter 40 is automatically updated during that time. The target transmittance is updated in time.

Figure 10:
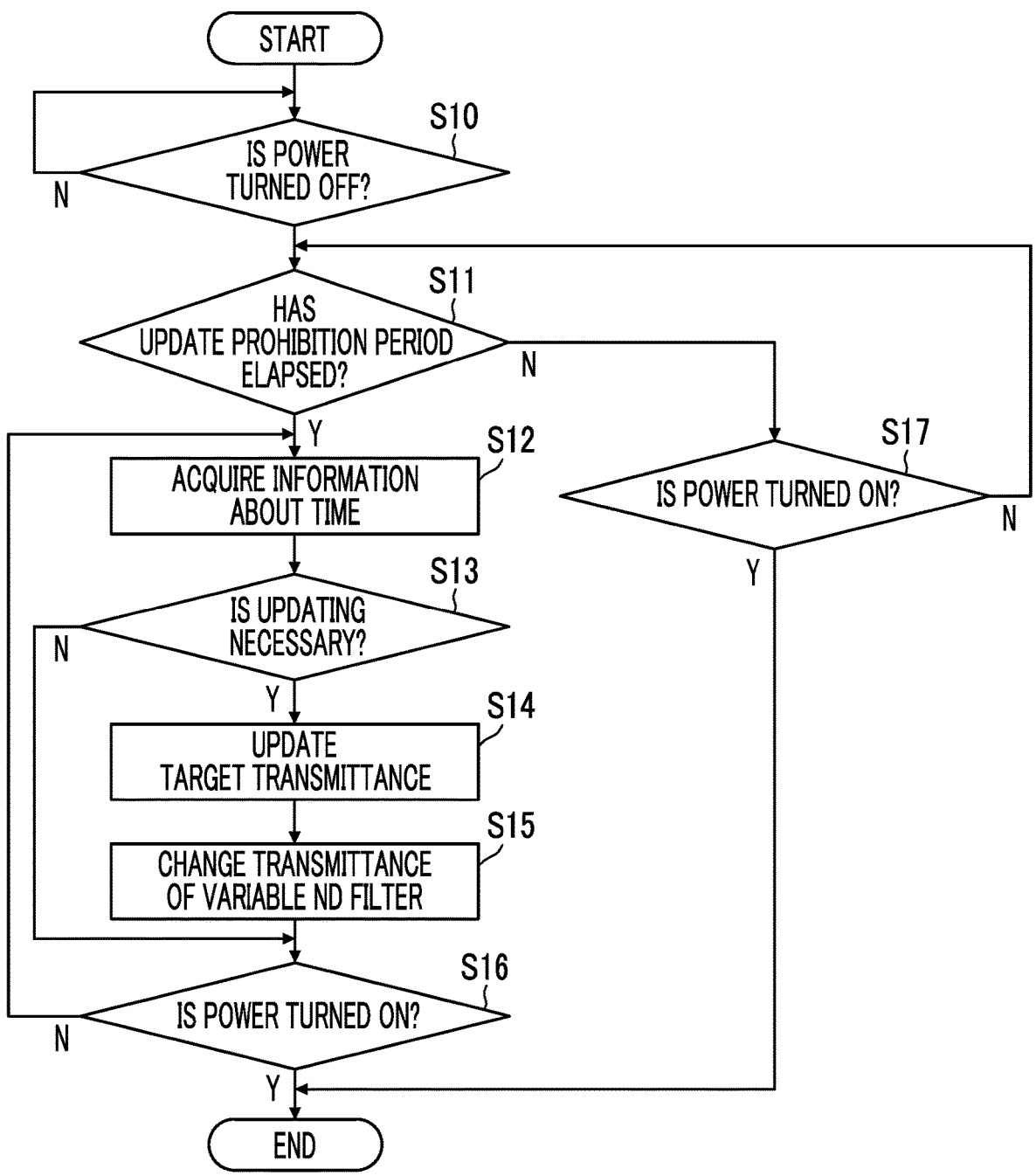
FIG. 10 is a flowchart showing a procedure of update processing of the target transmittance of the variable ND filter during power off.

FIG. 10 is a flowchart illustrating a procedure of update processing of the target transmittance of the variable ND filter during power off. This procedure is an example of a finder display control method.

First, it is determined whether or not power of the digital camera 1 is turned off (step S10). The digital camera 1 is turned on and off by operating the power lever 11. In a case where the power lever 11 is set to the OFF position, the power of the digital camera 1 is turned off.

In a case where power of the digital camera 1 is turned off, the transmittance of the variable ND filter 40 when power is turned off is maintained. Therefore, the target transmittance is maintained at the power off setting.

In a case where power of the digital camera 1 is turned off, the time elapsed since the power is turned off is measured, and it is determined whether or not the update prohibition period has elapsed (step S11).

In a case where it is determined in step S11 that the update prohibition period has not elapsed, it is determined whether or not power of the digital camera 1 is turned on (step S17). In a case where it is determined that power of the digital camera 1 is turned on, the update processing of the target transmittance ends. On the other hand, in a case where it is determined that power of the digital camera 1 is not turned on, the processing returns to step S11, and it is determined again whether or not the update prohibition period has elapsed.

In a case where it is determined in step S11 that the update prohibition period has elapsed, the information about the current time is acquired from the time measurement unit 80 (step S12). Next, on the basis of the acquired information about the time, it is determined whether or not the target transmittance needs to be updated (step S13). That is, the necessity of updating is determined on the basis of the setting of the current target transmittance and the information about the transmittance determined for each time zone. In a case where the current setting of the target transmittance is different from the transmittance determined for each time zone, it is determined that updating is necessary. For example, in a case where the current time is 15:00, the time zone is the daytime zone, and the transmittance to be set is the second transmittance τ2. On the other hand, in a case where the current target transmittance setting is the first transmittance τ1, it is determined that updating is necessary. On the other hand, in a case where the current target transmittance setting is the second transmittance τ2, it is determined that updating is unnecessary.

In a case where it is determined in step S13 that updating is necessary, the target transmittance is updated (step S14). In a case where the target transmittance is updated, the variable ND filter 40 is driven, and the transmittance is switched in accordance with the updated target transmittance (step S15). Thereafter, it is determined whether or not power of the digital camera 1 is turned on (step S16). In a case where it is determined that power of the digital camera 1 is turned on, the update processing of the target transmittance during power off is ended. On the other hand, in a case where it is determined that power is not turned on, the processing returns to step S12, and the information about the time is acquired again.

It is determined in step S13 that updating is unnecessary, the processing proceeds to step S16 without performing the update processing, and it is determined whether or not power of the digital camera 1 is turned on (step S16). In a case where it is determined that power of the digital camera 1 is turned on, the update processing of the target transmittance during power off is ended. On the other hand, in a case where it is determined that power is not turned on, the processing returns to step S12, and the information about the time is acquired again.

Thus, while power is turned off, the target transmittance is updated in time. Thereby, the variable ND filter 40 can be set to an appropriate transmittance from when power is turned on. As a result, the visibility of the display in the finder can be ensured satisfactorily from when the power is turned on. Further, at the time of updating, since the measurement of the brightness and the like is not performed, the power consumption can be suppressed.

Modification Example

«Modification Example of Transmittance Determined for Each Time Zone»

The transmittance determined for each time zone may be automatically switched in accordance with the use time, the use area, and the like. For example, one year is divided into spring, summer, autumn, and winter, and the transmittance for each time zone is individually set in each period. In this case, the transmittance determined for each time zone changes in accordance with the change of the date.

Second Embodiment

In the digital camera according to the present embodiment, the external light is measured under certain conditions while power is turned off, and the target transmittance of the variable ND filter is updated on the basis of the result of the photometry. The external light is measured in a case where the preliminary imaging operation is detected.

Here, the preliminary imaging operation is defined as an operation performed by the user on the imaging apparatus in a case of newly starting imaging from a power off state. This operation includes several modes. In the digital camera of the present embodiment, the operation of holding the digital camera is regarded as the preliminary imaging operation, and the operation is detected. In a case where the operation of holding the digital camera is detected while power of the digital camera is turned off, the external light is measured, and the target transmittance of the variable ND filter is updated on the basis of the result of the photometry.

Note that the configuration is substantially the same as the configuration of the digital camera 1 according to the first embodiment, except that a configuration for detecting a preliminary imaging operation is provided. Therefore, here, only the configuration for detecting the preliminary imaging operation and the update of the target transmittance of the variable ND filter using the detection result will be described.

[Configuration]

Figure 11:
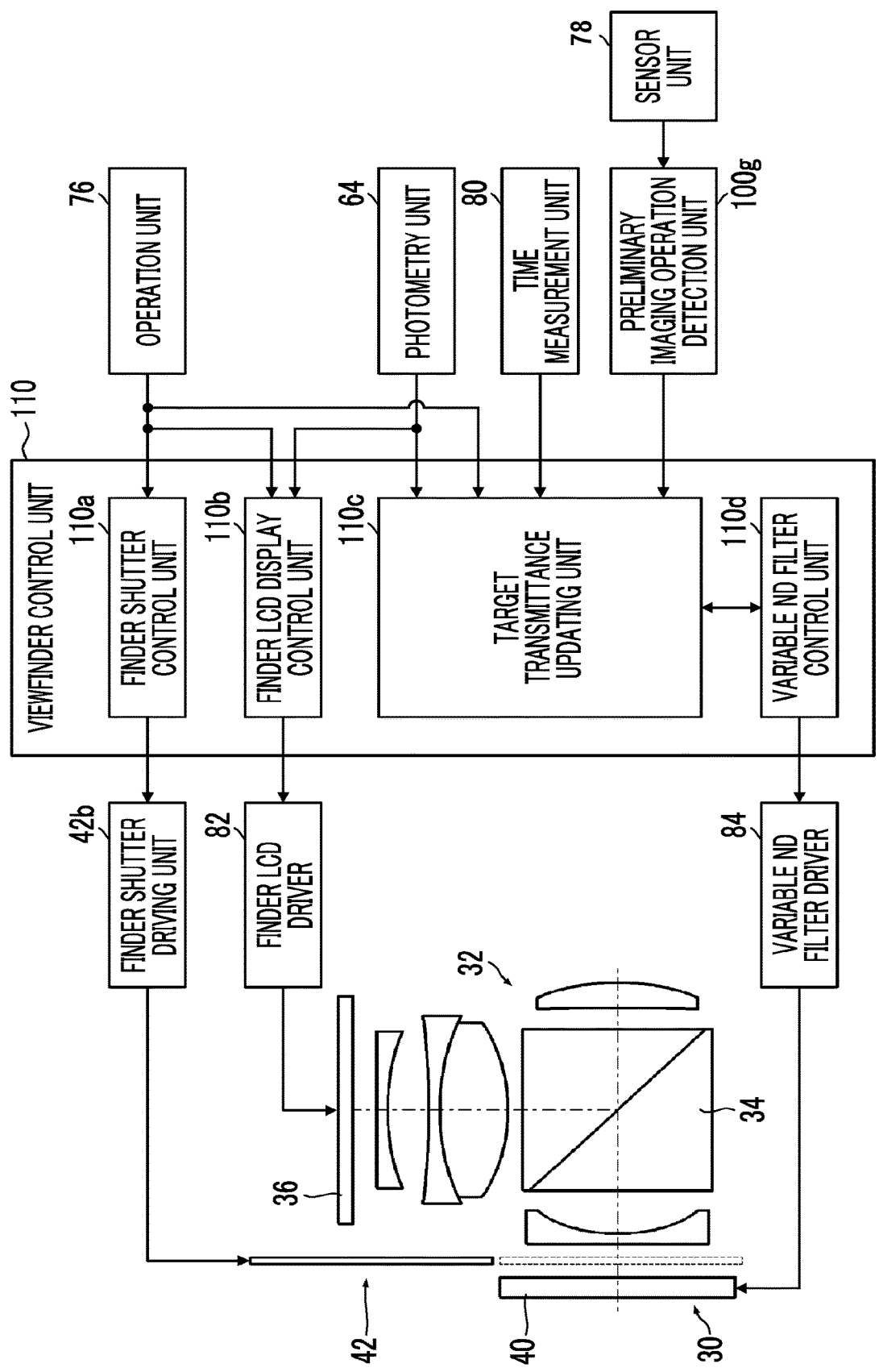
FIG. 11 is a block diagram of functions realized by a viewfinder control unit of the digital camera according to a second embodiment.

FIG. 11 is a block diagram of functions realized by the viewfinder control unit of the digital camera according to the present embodiment.

This digital camera is similar to the digital camera of the first embodiment in the following point. The viewfinder control unit 110 realizes the functions of the finder shutter control unit 110a, the finder LCD display control unit 110b, the target transmittance updating unit 110c, the variable ND filter control unit 110d, and the like. On the other hand, this digital camera is different from the digital camera of the first embodiment in the following point. The output from the preliminary imaging operation detection unit 100g is added to the target transmittance updating unit 110c.

«Preliminary Imaging Operation Detection Unit»

The preliminary imaging operation detection unit 100g detects a preliminary imaging operation on the basis of the output of the sensor unit 78 functioning as a level. Specifically, by detecting that the posture of the digital camera is in the horizontal state or the vertical state from the output of the sensor unit 78 and detecting that the digital camera is held, the preliminary imaging operation is detected. That is, in the digital camera of the present embodiment, in a case where the posture of the digital camera is in the horizontal state or the vertical state, it is determined that the digital camera is held, and this situation is detected as the preliminary imaging operation. The horizontal state is a so-called horizontal shooting posture, and the vertical state is a so-called vertical shooting posture.

The preliminary imaging operation detection unit 100g detects the horizontal state and the vertical state with a certain width. That is, the horizontal state and the vertical state are detected assuming that the states includes the range that can be regarded as substantially horizontal and the range that can be regarded as substantially vertical.

The function of the preliminary imaging operation detection unit 100g is realized by the camera control unit 100 executing a predetermined program.

«Target Transmittance Updating Unit»

The processing in a case where power of the digital camera is turned on is the same as that of the digital camera according to the first embodiment. Therefore, here, only the processing in a case where power of the digital camera is turned off will be described.

In a case where power of the digital camera is turned off, the target transmittance updating unit 110c updates the target transmittance of the variable ND filter 40 in time with the elapse of the update prohibition period. This is the same as the case of the digital camera of the first embodiment. Further, in the digital camera according to the present embodiment, in a case where the preliminary imaging operation detection unit 100g detects the preliminary imaging operation, the target transmittance of the variable ND filter 40 is updated on the basis of the result of photometry performed by the photometry unit 64. Specifically, in a case where the brightness (luminance) of the subject measured by the photometry unit 64 is less than the threshold value BT, the transmittance of the variable ND filter 40 is set as a first transmittance $\tau 1$. In a case where the brightness is equal to or greater than the threshold value BT, the transmittance of the variable ND filter 40 is set as a second transmittance $\tau 2$. This is the same as that in a case where power of the digital camera is turned on. The second transmittance $\tau 2$ is a value lower than the first transmittance $\tau 1$ ($\tau 1 > \tau 2$).

As described above, in the digital camera according to the present embodiment, in a case where the preliminary imaging operation is detected while power is turned off, the external light is measured, and the transmittance of the variable ND filter 40 is switched on the basis of the result of photometry.

[Effect]

Figure 12:
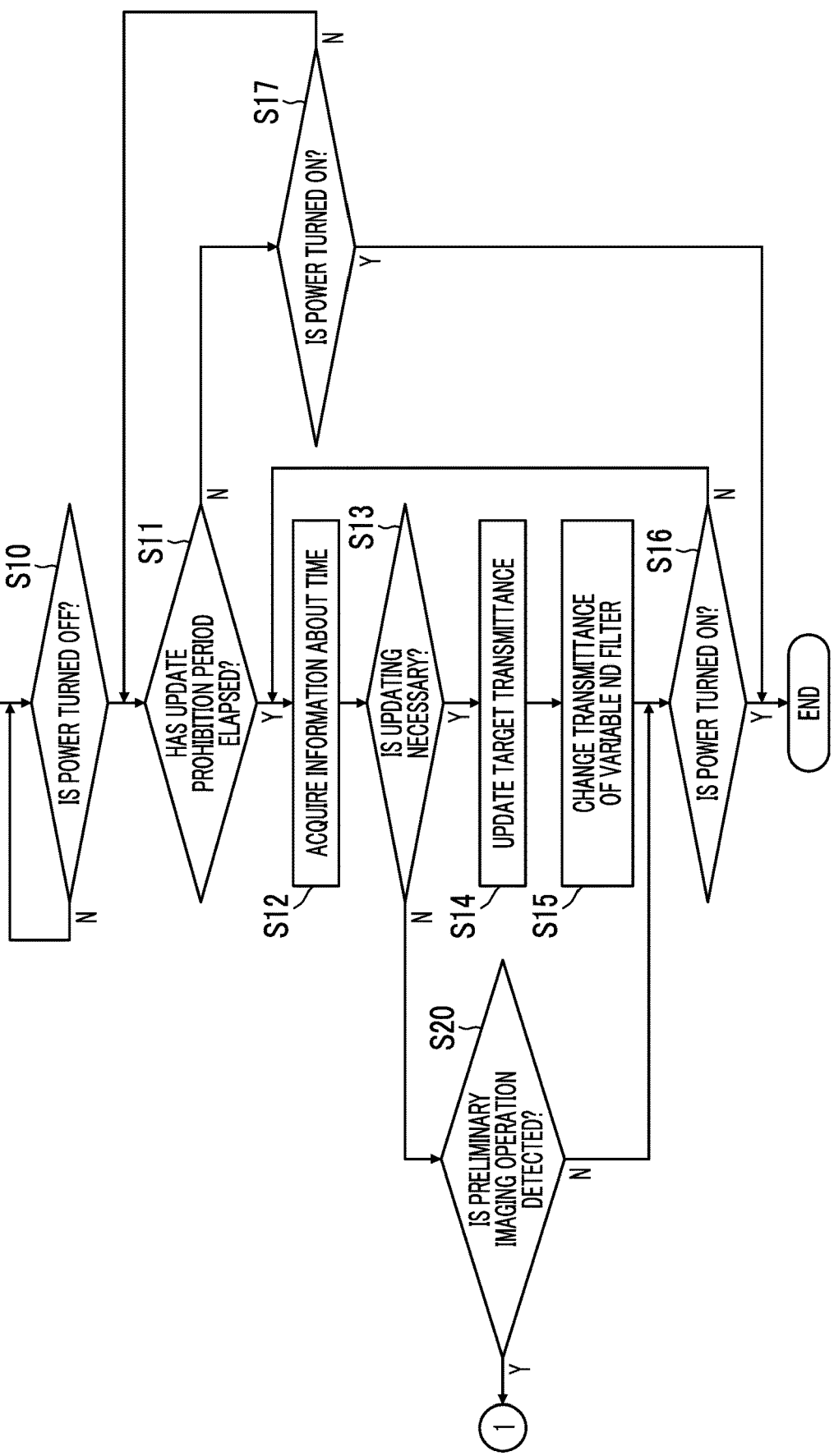
FIG. 12 is a flowchart showing a procedure of update processing of the target transmittance of the variable ND filter during power off.
Figure 13:
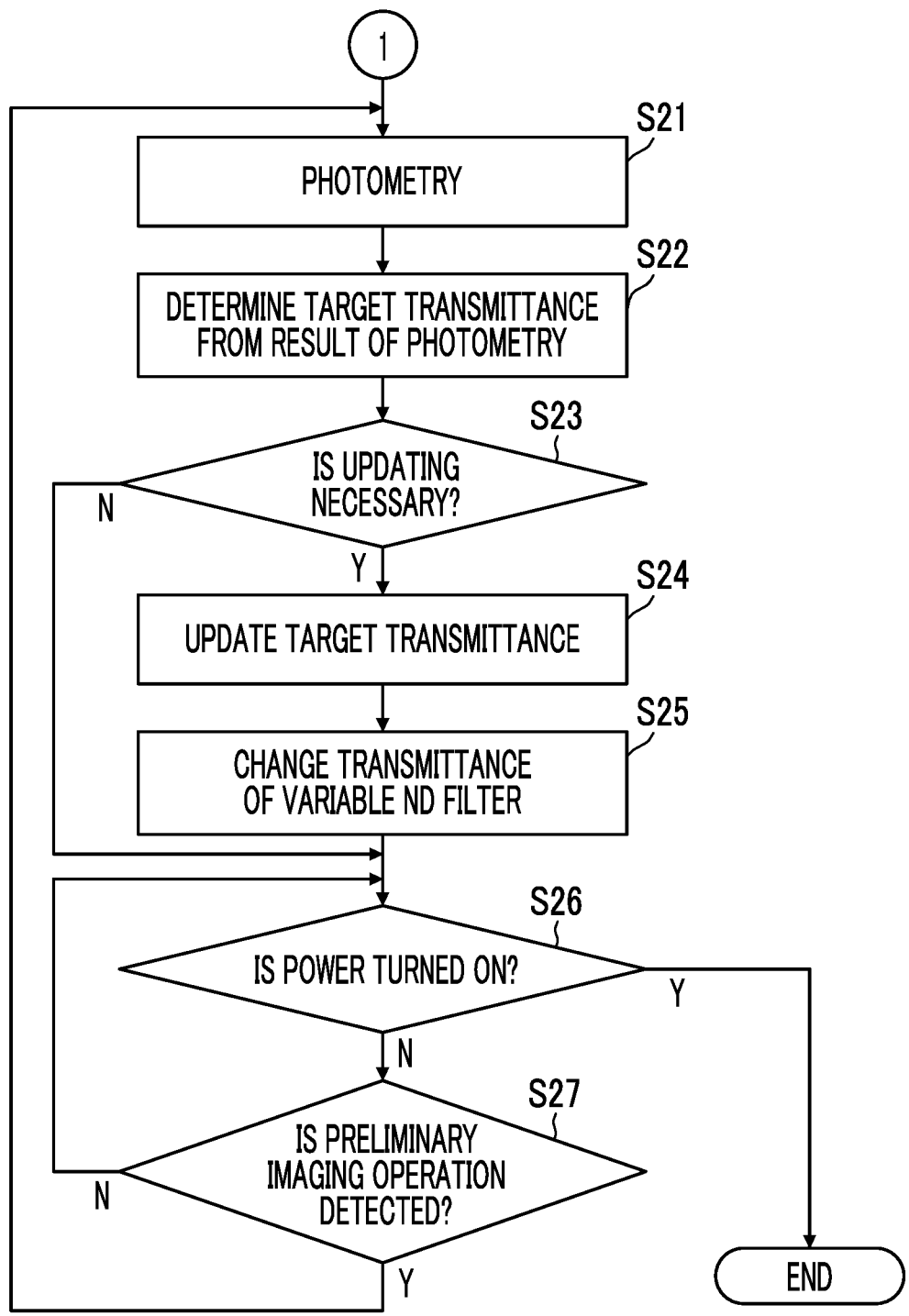
FIG. 13 is a flowchart showing a procedure of update processing of the target transmittance of the variable ND filter during power off.

FIGS. 12 and 13 are flowcharts each illustrating the procedure of the update processing of the target transmittance of the variable ND filter during power off. This procedure is an example of a finder display control method.

As shown in FIG. 12, first, it is determined whether or not power of the digital camera 1 is turned off (step S10). The digital camera 1 is turned on and off by operating the power lever 11. In a case where the power lever 11 is set to the OFF position, the power of the digital camera 1 is turned off.

In a case where power of the digital camera 1 is turned off, the transmittance of the variable ND filter 40 when power is turned off is maintained. Therefore, the target transmittance is maintained at the power off setting.

In a case where power of the digital camera 1 is turned off, the time elapsed since the power is turned off is measured, and it is determined whether or not the update prohibition period has elapsed (step S11).

In a case where it is determined in step S11 that the update prohibition period has not elapsed, it is determined whether or not power of the digital camera 1 is turned on (step S17). In a case where it is determined that power of the digital camera is turned on, the update processing of the target transmittance ends. On the other hand, in a case where it is determined that power of the digital camera is not turned on, the processing returns to step S11, and it is determined again whether or not the update prohibition period has elapsed.

In a case where it is determined in step S11 that the update prohibition period has elapsed, the information about the current time is acquired from the time measurement unit 80 (step S12). Next, on the basis of the acquired information about the time, it is determined whether or not the target transmittance needs to be updated (step S13).

In a case where it is determined in step S13 that updating is necessary, the target transmittance is updated (step S14). In a case where the target transmittance is updated, the variable ND filter 40 is driven, and the transmittance is switched in accordance with the updated target transmittance (step S15). Thereafter, it is determined whether or not power of the digital camera is turned on (step S16). In a case where it is determined that power of the digital camera is turned on, the update processing of the target transmittance during power off is ended. On the other hand, in a case where it is determined that power is not turned on, the processing returns to step S12, and the information about the time is acquired again.

In a case where it is determined in step S13 that updating is unnecessary, it is determined whether or not the preliminary imaging operation is detected (step S20). The preliminary imaging operation is detected by the preliminary imaging operation detection unit 100g. The preliminary imaging operation detection unit 100g detects a preliminary imaging operation on the basis of the output of the sensor unit 78. That is, the preliminary imaging operation is detected by detecting the horizontal state or the vertical state of the digital camera on the basis of the output of the sensor unit 78 functioning as a level.

In a case where it is determined in step S20 that the preliminary imaging operation is not detected, it is determined whether or not power of the digital camera is turned on (step S16). In a case where it is determined that power of the digital camera is turned on, the update processing of the target transmittance during power off is ended. On the other hand, in a case where it is determined that power is not turned on, the processing returns to step S12, and the information about the time is acquired again.

On the other hand, in a case where it is determined in step S20 that the preliminary imaging operation is detected, photometry processing is performed as shown in FIG. 13. That is, the image sensor 52 is driven, and the brightness (luminance) of the subject is detected by the photometry unit 64 on the basis of the output from the image sensor 52.

In a case where the photometry is performed by the photometry unit 64, the target transmittance of the variable ND filter 40 is determined on the basis of the result of photometry (step S22). The target transmittance of the variable ND filter 40 is set as the first transmittance $\tau 1$ in a case where the brightness (luminance) of the subject measured by the photometry unit 64 is less than the threshold value BT. On the other hand, in a case where the brightness is equal to or greater than the threshold value BT, the target transmittance is set as the second transmittance $\tau 2$.

In a case where the target transmittance of the variable ND filter 40 is determined from the result of photometry, it is determined whether or not the current setting of the target transmittance needs to be updated (step S23). That is, it is determined whether or not the current setting of the target transmittance matches the target transmittance obtained from the result of photometry. In a case where those match, it is determined that updating is unnecessary. On the other hand, in a case where those do not match, it is determined that updating is necessary.

In a case where it is determined in step S23 that updating is necessary, the target transmittance is updated (step S24). In a case where the target transmittance is updated, the variable ND filter 40 is driven, and the transmittance is switched in accordance with the updated target transmittance (step S25). Thereafter, it is determined whether or not power of the digital camera is turned on (step S26).

On the other hand, in a case where it is determined in step S23 that updating is unnecessary, the update processing is not performed, and the processing directly proceeds to step S26, where it is determined whether or not power of the digital camera 1 is turned on (step S26).

In a case where it is determined in step S26 that the power of the digital camera is turned on, the update processing of the target transmittance during power off is ended.

On the other hand, in a case where it is determined in step S26 that the power of the digital camera is not turned on, it is determined whether or not the preliminary imaging operation is detected (step S27). In a case where it is determined that the preliminary imaging operation is detected, the processing returns to step S21, and the photometry processing is performed (step S21). On the other hand, in a case where it is determined that the preliminary imaging operation is not detected, the processing returns to step S26, and it is determined again whether or not power of the digital camera is turned on (step S26).

As described above, in the digital camera according to the present embodiment, in a case where the transmittance of the variable ND filter 40 is switched in time while power is turned off and the preliminary imaging operation is detected while power is turned off, the photometry processing is performed. The transmittance of the variable ND filter 40 is switched on the basis of the result of the photometry processing. As a result, the visibility of the finder display can be satisfactorily ensured from when the power is turned on. Further, since the photometry processing is performed only in a case where the preliminary imaging operation is detected, power consumption can also be suppressed.

Modification Example

«Modification Example of Detection of Preliminary Imaging Operation»

In the above-described embodiment, the horizontal state or the vertical state of the digital camera is detected to detect the preliminary imaging operation. However, the method of detecting the preliminary imaging operation is not limited to this. In addition, for example, a configuration in which an operation of holding the grip 2a of the camera body 2 is detected to detect a preliminary imaging operation may be adopted. The operation of holding the grip 2a of the camera body 2 can be detected, for example, by attaching a touch sensor to the grip 2a. Further, in the case of a configuration in which a lens cap is attached to the imaging lens 3, a configuration in which an operation for removing the lens cap is detected to detect a preliminary imaging operation may be adopted. Attachment or detachment of the lens cap can be detected, for example, by attaching a sensor for detecting whether or not the lens cap is attached to the imaging lens 3.

«Modification Example of Level»

In the above embodiment, the level is configured by the sensor unit 78 comprising the triaxial acceleration sensor 78a, the triaxial angular velocity sensor 78b, and the triaxial geomagnetic sensor 78c, but the configuration of the level is not limited thereto. In addition, a well-known level can be employed.

«Modification Example of Processing after Detection of Preliminary Imaging Operation»

In the above embodiment, in a case where the preliminary imaging operation is detected, updating is not performed in time, but power of the digital camera is not turned on within a certain period of time after the first preliminary imaging operation is detected. In this case, a configuration may be adopted in which the update processing is performed again in time. For example, in a case where it is determined in step S26 that power of the digital camera is not turned on, it is determined whether or not a certain period of time has elapsed since the detection of the first preliminary imaging operation. In a case where the certain period of time has not elapsed, the processing proceeds to step S27, and it is determined whether or not the preliminary imaging operation is detected. On the other hand, in a case where the certain period of time has elapsed, the processing returns to step S12, and returns to the update in time. Thus, switching of the transmittance of the variable ND filter 40 due to erroneous detection can be prevented.

Third Embodiment

Figure 14:
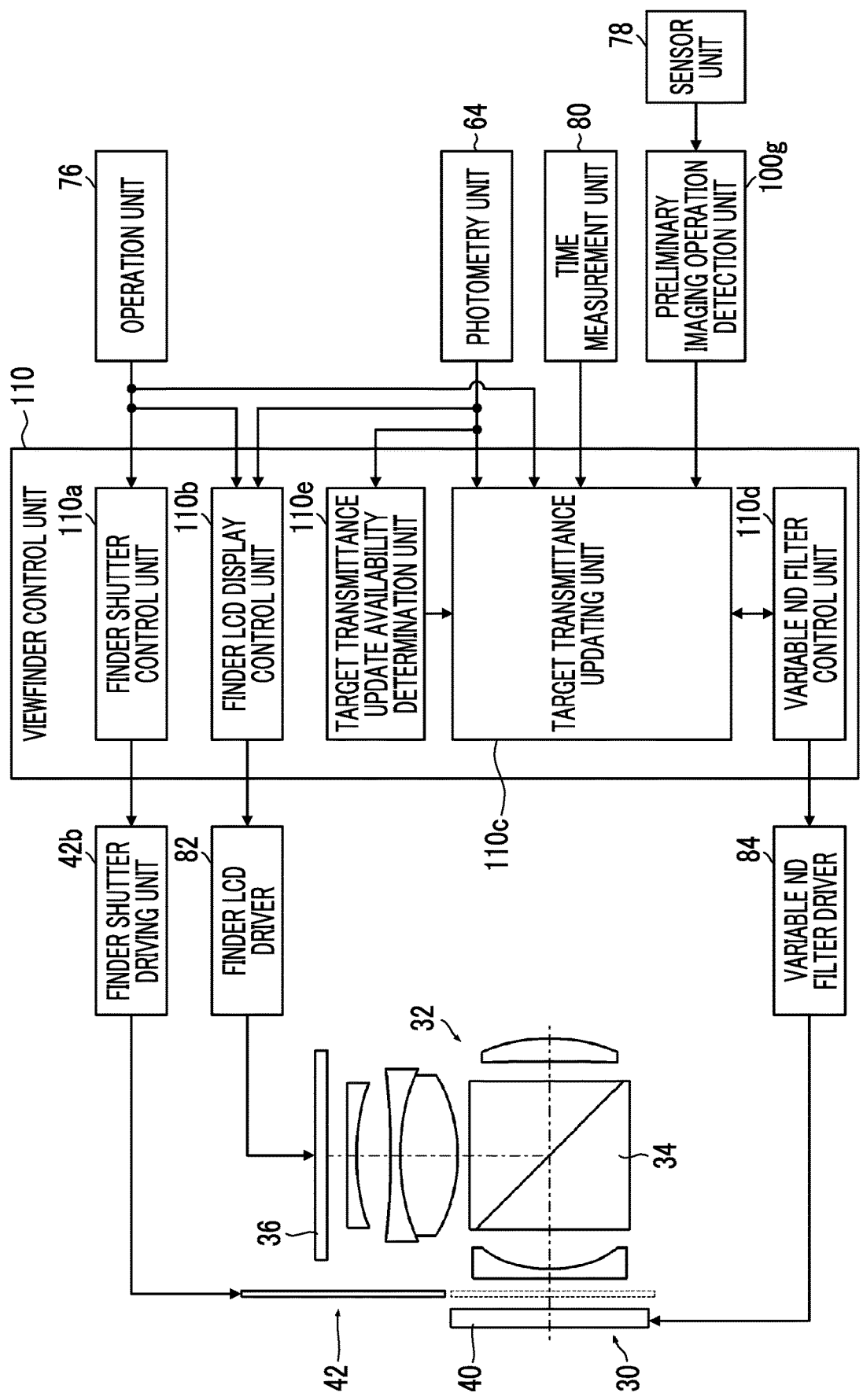
FIG. 14 is a block diagram of functions realized by a viewfinder control unit of the digital camera according to a third embodiment.

FIG. 14 is a block diagram of functions realized by the viewfinder control unit of the digital camera according to the present embodiment.

As shown in the drawing, this digital camera is different from the digital camera of the second embodiment in that the viewfinder control unit 110 further has a function of a target transmittance update availability determination unit 110e.

The target transmittance update availability determination unit 110e determines whether or not the target transmittance of the variable ND filter 40 can be updated. The target transmittance updating unit 110c updates the target transmittance in a case where the target transmittance update availability determination unit 110e determines that the target transmittance can be updated. Therefore, even in a case where it is determined that the target transmittance needs to be updated on the basis of the result of photometry, the target transmittance update availability determination unit 110e does not perform the update processing in a case where it is determined that the target transmittance cannot be updated.

The target transmittance update availability determination unit 110e determines whether or not the target transmittance can be updated on the basis of the result of photometry of the photometry unit 64. Specifically, in a case where the brightness (luminance) of the subject measured by the photometry unit 64 is equal to or less than a predetermined reference value, the target transmittance cannot be updated. That is, in a case where the brightness of the subject measured by the photometry unit 64 is equal to or less than a certain value, it is assumed that the digital camera is housed in a casing or the like, and it is determined that the target transmittance cannot be updated. In a case where the digital camera is housed in a casing or the like, an accurate photometric value cannot be obtained. Therefore, in this case, it is determined that the target transmittance cannot be updated. The reference value is set, for example, to a value obtained in a case where photometry is performed in a dark place.

Figure 15:
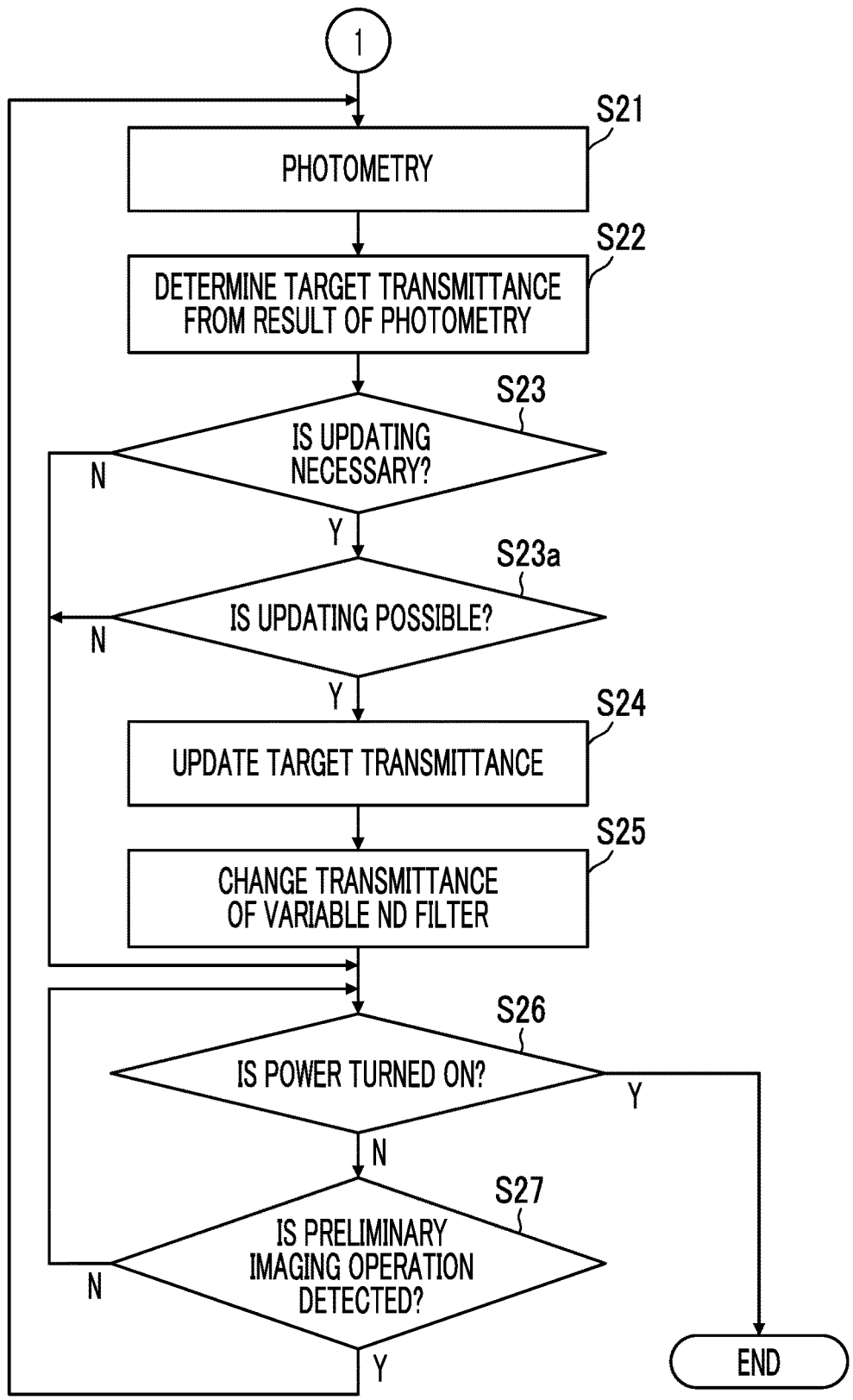
FIG. 15 is a flowchart showing a procedure of update processing of the target transmittance of the variable ND filter during power off.

FIGS. 12 and 15 are flowcharts each illustrating a procedure of the update processing of the target transmittance of the variable ND filter during power off. This procedure is an example of a finder display control method.

In step S20, the processing until it is determined that the preliminary imaging operation is detected is the same as that of the digital camera according to the second embodiment.

In a case where it is determined in step S20 that the preliminary imaging operation is detected, the photometry processing is performed as shown in FIG. 15. That is, the image sensor 52 is driven, and the brightness (luminance) of the subject is detected by the photometry unit 64 on the basis of the output from the image sensor 52.

In a case where the photometry is performed by the photometry unit 64, the target transmittance of the variable ND filter 40 is determined on the basis of the result of photometry (step S22). The target transmittance of the variable ND filter 40 is set as the first transmittance τ1 in a case where the brightness (luminance) of the subject measured by the photometry unit 64 is less than the threshold value BT. On the other hand, in a case where the brightness is equal to or greater than the threshold value BT, the target transmittance is set as the second transmittance τ2.

In a case where the target transmittance of the variable ND filter 40 is determined from the result of photometry, it is determined whether or not the current setting of the target transmittance needs to be updated (step S23). That is, it is determined whether or not the current setting of the target transmittance matches the target transmittance obtained from the result of photometry. In a case where those match, it is determined that updating is unnecessary. On the other hand, in a case where those do not match, it is determined that updating is necessary.

In a case where it is determined in step S23 that updating is necessary, it is next determined whether or not updating is possible (step S23*a*). Whether or not updating is possible is determined on the basis of the result of photometry of the photometry unit 64. That is, in a case where the brightness of the subject measured by the photometry unit 64 is equal to or less than the reference value, it is determined that the update cannot be performed. On the other hand, in a case where the brightness of the subject measured by the photometry unit 64 is greater than the reference value, it is determined that updating is possible.

In a case where it is determined in step S23*a* that updating is possible, the target transmittance is updated (step S24). In a case where the target transmittance is updated, the variable ND filter 40 is driven, and the transmittance is switched in accordance with the updated target transmittance (step S25). Thereafter, it is determined whether or not power of the digital camera is turned on (step S26).

On the other hand, in a case where it is determined in step S23*a* that updating is not possible, the update processing is not performed, and the processing directly proceeds to step S26, where it is determined whether or not power of the digital camera 1 is turned on (step S26). In a case where it is determined in step S23 that updating is unnecessary, the processing similarly proceeds to step S26, and it is determined whether or not power of the digital camera 1 is turned on (step S26).

In a case where it is determined in step S26 that the power of the digital camera is turned on, the update processing of the target transmittance during power off is ended.

On the other hand, in a case where it is determined in step S26 that the power of the digital camera is not turned on, it is determined whether or not the preliminary imaging operation is detected (step S27). In a case where it is determined that the preliminary imaging operation is detected, the processing returns to step S21, and the photometry processing is performed (step S21). On the other hand, in a case where it is determined that the preliminary imaging operation is not detected, the processing returns to step S26, and it is determined again whether or not power of the digital camera is turned on (step S26).

As described above, in the digital camera according to the present embodiment, in a case where the transmittance of the variable ND filter 40 is switched in time while power is turned off and the preliminary imaging operation is detected while power is turned off, the photometry processing is performed. The transmittance of the variable ND filter 40 is switched on the basis of the result of the photometry processing. As a result, the visibility of the finder display can be satisfactorily ensured from when the power is turned on. Further, since the photometry processing is performed only in a case where the preliminary imaging operation is detected, power consumption can also be suppressed. Further, according to the digital camera of the present embodiment, the suitability of the photometry is determined, and the update processing is prohibited as necessary. Therefore, the transmittance of the variable ND filter 40 can be appropriately updated.

Modification Example

«Modification Example of Determination of Whether or not Target Transmittance can be Updated»

In the above embodiment, whether or not the target transmittance can be updated is determined on the basis of the result of photometry of the photometry unit 64. However, the method of determining whether or not the target transmittance can be updated is not limited to this. In addition, for example, in the case of performing photometry on the basis of the output of the image sensor 52, it is determined that photometry is not possible in a case where the cap is attached to the imaging lens 3. Therefore, in this case, whether or not the target transmittance can be updated can be determined by detecting whether or not the cap is attached. That is, in a case where the attachment of the cap is detected, it is determined that the target transmittance cannot be updated. Even in a case where the digital camera is housed in a casing, it is determined that photometry is not possible. Therefore, in this case, it is possible to adopt a configuration in which it is determined whether or not the target transmittance can be updated by detecting whether or not the digital camera is housed in the casing. As described above, it is possible to adopt a configuration in which whether or not photometry performed by the photometry unit is possible is detected and it is determined whether or not the target transmittance can be updated is determined on the basis of the detection result. Further, a configuration is made such that the photometry during power off can be prohibited by setting of the user, and it is determined whether or not the target transmittance can be updated on the basis of the setting state.

Other Embodiments

[Switching Execution Level According to Remaining Battery Capacity]

The update processing of the target transmittance of the variable ND filter, which is performed while power of the digital camera is turned off, preferably switches the execution level in accordance with the remaining battery capacity.

Figure 16:
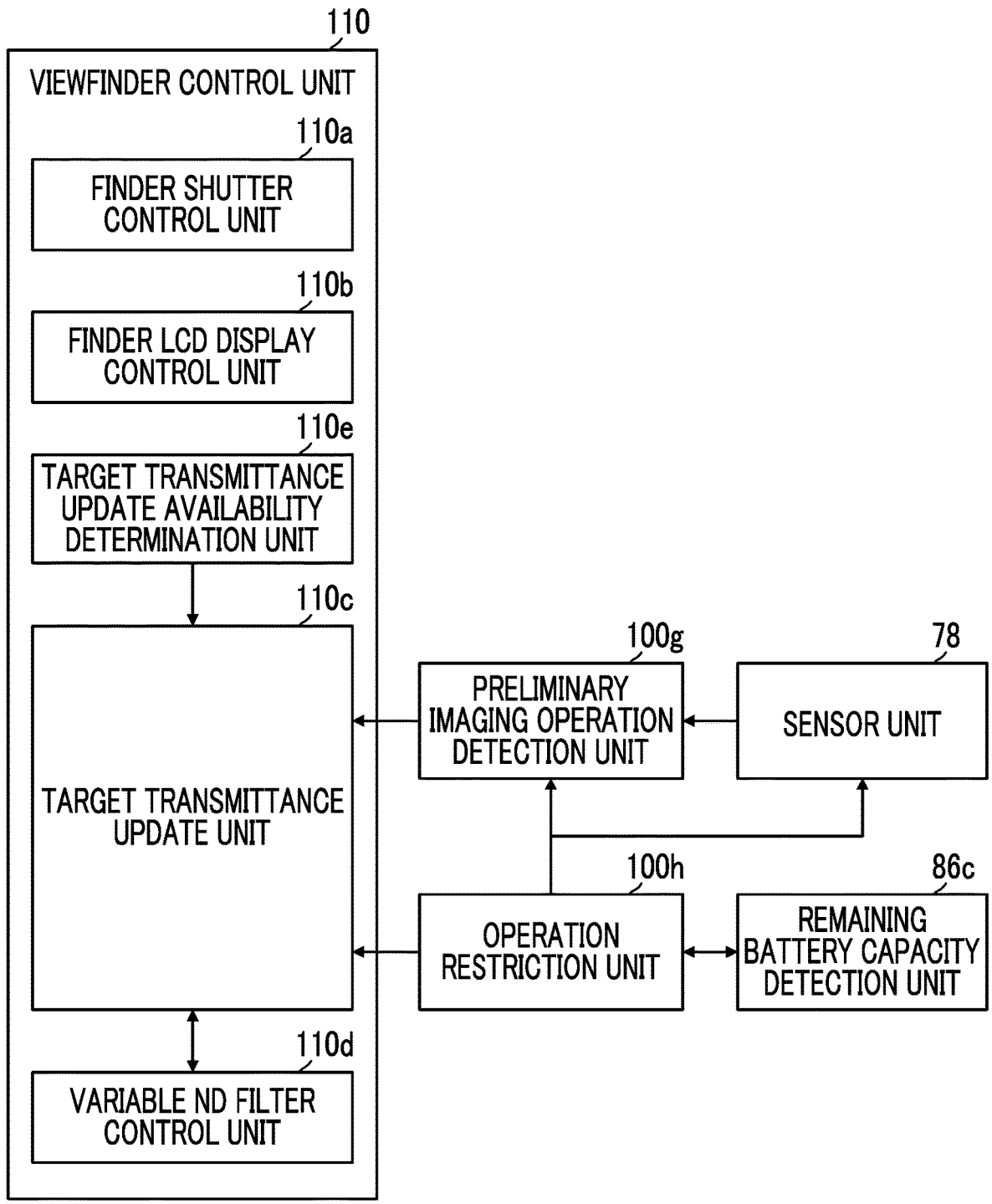
FIG. 16 is a block diagram of a system for switching an execution level of update processing of the target transmittance in accordance with a remaining battery capacity.

FIG. 16 is a block diagram of a system for switching the execution level of the update processing of the target transmittance in accordance with the remaining battery capacity.

As shown in the drawing, an operation restriction unit 100*h* is provided as a configuration necessary to switch the execution level of the update processing of the target transmittance in accordance with the remaining battery capacity. The operation restriction unit 100*h* is provided as a function of the camera control unit 100. That is, the camera control unit 100 functions as the operation restriction unit 100*h* by executing a predetermined program.

The operation restriction unit 100h acquires information about the remaining battery capacity from the remaining battery capacity detection circuit 86c, and restricts operations of the sensor unit 78, the preliminary imaging operation detection unit 100g, and the target transmittance updating unit 110c stepwise, on the basis of the obtained information about the remaining battery capacity. Specifically, in a case where the remaining battery capacity is equal to or less than the first remaining capacity, the operations of the sensor unit 78 and the preliminary imaging operation detection unit 100g are stopped. Thereby, the detection processing of the preliminary imaging operation is stopped. In a case where the remaining battery capacity is further reduced and is equal to or less than a second remaining capacity that is smaller than the first remaining capacity, the operation of the target transmittance updating unit 110c is stopped. Thus, the update processing of the target transmittance of the variable ND filter 40 while power is turned off is stopped.

As described above, the execution level of the update processing of the target transmittance is switched stepwise in accordance with the remaining battery capacity. Thus, the target transmittance of the variable ND filter 40 can be appropriately updated while suppressing power consumption.

[Modification Example of Variable ND Filter]

In the above-mentioned embodiment, an ND filter composed of an electrochromic element is used as the electronic variable ND filter, but the electronic variable ND filter applicable to the present invention is not limited to this. Any ND filter having a configuration capable of electronically controlling the transmittance (density) may be used. Therefore, for example, an ND filter composed of liquid crystal can be used.

Further, in the above-mentioned embodiment, the transmittance of the variable ND filter 40 is switched in two stages, but may be switched in a smaller number of stages. For example, a configuration in which switching is performed in three stages may be adopted.

In the above-mentioned embodiment, the variable ND filter 40 is disposed in the finder window unit 30a, but the arrangement position of the variable ND filter 40 is not limited to this. The variable ND filter 40 may be disposed in the optical path from the finder window unit part 30a to the beam splitter 34.

[Modification Example of Display Device]

In the above-mentioned embodiment, the LCD is used as the display device, but the display device applicable to the present invention is not limited to this. In addition, for example, display devices such as an organic electroluminescence display (Organic Light Emitting Diode Display, OLED Display), a fluorescent display tube (VFD: Vacuum Fluorescent Display), and a plasma display panel (PDP), particularly, flat panel display devices can be used.

[Modification Example of Photometry Unit]

In the above-mentioned embodiment, the configuration is such that the external light is measured on the basis of the image signal which is output from the image sensor 52, but the configuration of the photometry unit that measures the external light is not limited to this.

Figure 17:
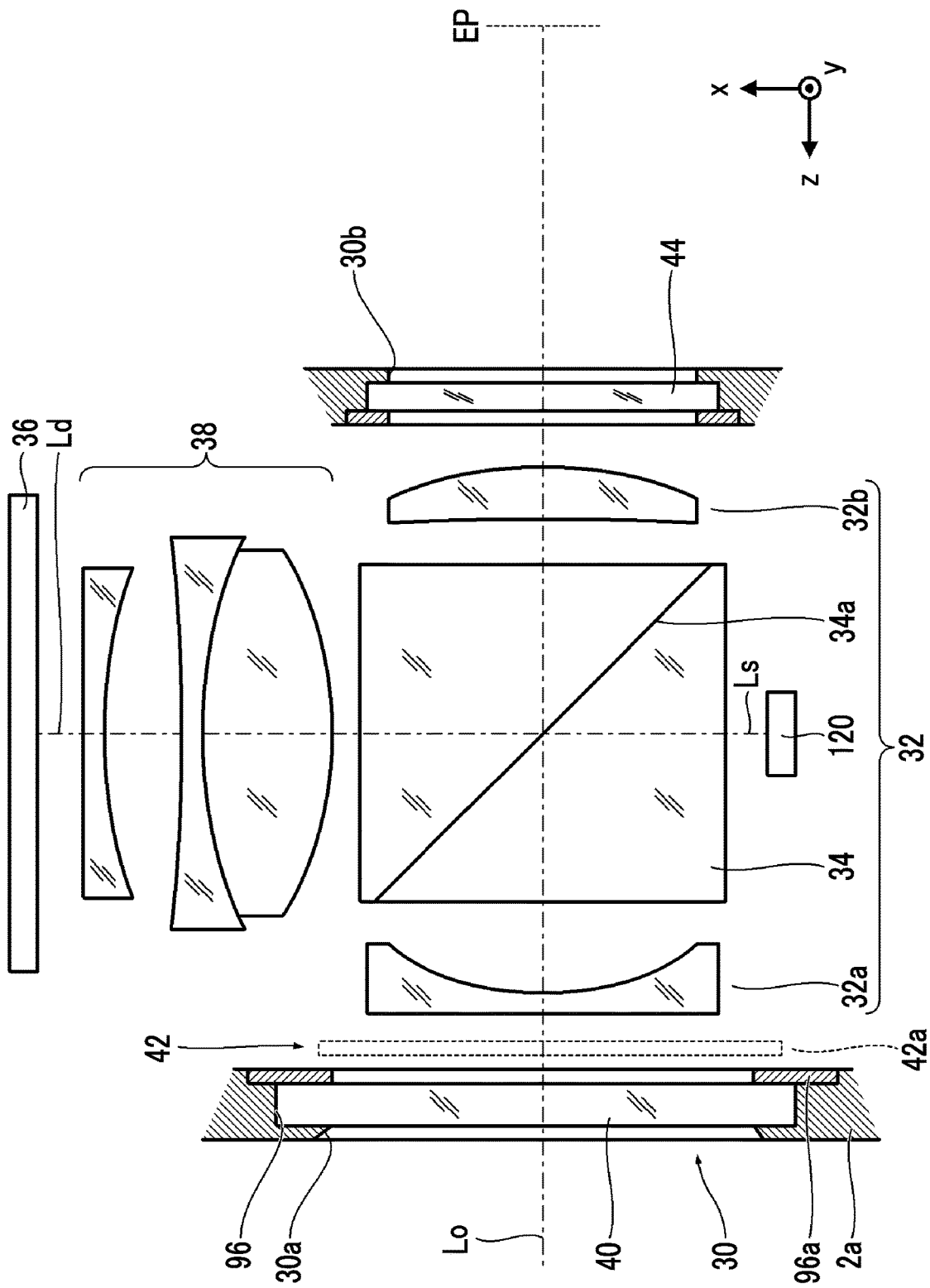
FIG. 17 is a schematic configuration diagram showing another example of the photometry unit.

FIG. 17 is a schematic configuration diagram showing another example of the photometry unit.

As shown in the drawing, the photometry unit of this example is composed of an illuminance sensor 120. The illuminance sensor 120 is disposed on an optical axis Ls orthogonal to the optical axis Lo of the observation optical system 32 and passing through the semi-transparent film 34a of the beam splitter 34. A part of the external light incident from the finder window unit 30a and a part of the light from the finder LCD 36 are incident into the illuminance sensor 120. The external light incident from the finder window unit 30a is transmitted through the variable ND filter 40 and the objective lens 32a, and is incident into the beam splitter 34. A part of the external light incident into the beam splitter 34 is reflected by the semi-transparent film 34a and is incident into the illuminance sensor 120. The light from the finder LCD 36 is incident into the beam splitter 34, and a part of the light is transmitted through the semi-transparent film 34a and is incident into the illuminance sensor 120. The illuminance sensor 120 detects the illuminance inside the viewfinder 30 on the basis of the light amount of the light incident into the light receiving unit. The variable ND filter control unit switches the transmittance of the variable ND filter 40 on the basis of the result of detection of the illuminance sensor 120.

In this example, the illuminance sensor 120 detects the illuminance in the finder. However, for example, the illuminance sensor may be disposed in front surface of the camera body to detect the illuminance of external light. In such a case, it is preferable that the illuminance sensor 120 is provided near the finder window unit 30a.

[Modification Example of Superimposing Optical Element]

In the above-mentioned embodiment, the prism type beam splitter 34 is used as the superimposing optical element, but the superimposing optical element applicable to the present invention is not limited to this. In addition, for example, a half mirror or the like can be used as a superimposing optical element.

[Application to Camera Equipped with Reflex Finder]

The present invention can be applied to a camera having a reflex finder. For example, the present invention can be applied to a single-lens reflex camera.

FIG. 18 is a schematic configuration diagram showing an example of a single-lens reflex camera according to the present invention.

The single-lens reflex camera 200 comprises a reflex finder 210 as its optical finder.

As shown in FIG. 18, the light passing through the imaging lens 202 is reflected by a reflection mirror 212 and forms an image on a focusing screen 214 placed on an image forming surface equivalent to the image forming surface of the image sensor 204. The user observes the optical image of the subject formed on the focusing screen 214 through the eyepiece lens 216 and the pentagonal roof prism 218.

The single-lens reflex camera 200 of this example further comprises a finder LCD 220, and a beam splitter 222 and a target lens 224 for superimposing display of the finder LCD 220 on an image observed from the eyepiece lens 216.

The beam splitter 222 is an example of a superimposing optical element. The beam splitter 222 has a semi-transparent film 222a on the inner slope. The beam splitter 222 is disposed between the pentagonal roof prism 218 and the eyepiece lens 216.

The finder LCD 220 is an example of a display device. The finder LCD 220 is disposed on an optical axis orthogonal to the optical axis of eyepiece lens 216.

The target lens 224 is disposed in an optical path between the finder LCD 220 and the beam splitter 222, and guides light from the finder LCD 220 to the eyepiece lens 216.

In a case where an image is displayed on the finder LCD 220, the light from the finder LCD 220 is incident into the beam splitter 222 through the target lens 224. The light incident into the beam splitter 222 is reflected by the semi-transparent film 222*a* and is incident on the eye point EP through the eyepiece lens 216.

Thereby, the display on the finder LCD 220 is observed in a state where the display is superimposed on the image on the focusing screen.

In the single-lens reflex camera 200 of this example, a variable ND filter 226 is further disposed between the pentagonal roof prism 218 and the beam splitter 222. The variable ND filter 226 is an example of an electronic variable ND filter, and is composed of an ND filter that is able to electronically control the transmittance. The variable ND filter 226 adjusts the light amount of light incident into the beam splitter 222 from the pentagonal roof prism 218 by changing the transmittance (density) thereof. The transmittance of the variable ND filter 226 is measured by a transmittance measurement unit (not shown).

As in the digital camera 1 of the above-mentioned embodiment, the transmittance of the variable ND filter 226 is switched on the basis of the result of photometry of the external light.

In a case where the transmittance of the variable ND filter 226 is switched, the transmittance is measured in real time by the transmittance measurement unit. Then, on the basis of the result of measurement, the light amount of the finder LCD 220 is controlled in real time.

As described above, the present invention can be applied to a camera having a reflex finder.

[Modification Example of Viewfinder]

In the above-mentioned embodiment, the configuration is made such that the viewfinder can be used also as an EVF, but the function as an EVF may be removed. In such a case, the finder shutter can be removed.

Further, in the above-mentioned embodiment, the finder shutter is composed of a so-called mechanical shutter, but a liquid crystal shutter or the like may be used.

Further, in the above-mentioned embodiment, the observation optical system 32 is composed of the observation optical system of the reverse Galileo finder, but the configuration of the observation optical system of the viewfinder is not limited to this. The imaging lens may be composed of an independent optical system.

[Modification Example of Imaging Apparatus]

In the above-mentioned embodiment, the case where the present invention is applied to a digital camera with an integrated lens has been described as an example, but the application of the present invention is not limited to this. The present invention can be similarly applied to an interchangeable-lens-type digital camera.

Other Modification Examples

In the above-mentioned embodiment, the camera control unit 100 is composed of a microcomputer, but the hardware configuration for realizing these functions is not limited to this. The camera control unit 100 can be composed of various processors. Various processors includes a CPU as a general-purpose processor which functions as a processing unit executing various kinds of processing by executing software (programs); a programmable logic device (PLD) as a processor capable of changing a circuit configuration after manufacturing a field programmable gate array (FPGA); and a dedicated electrical circuit as a processor, which has a circuit configuration specifically designed to execute specific processing, such as an application specific integrated circuit (ASIC).

One processing unit may be composed of one of these various processors, or may be composed of two or more processors of the same type or different types. For example, one processing unit may be composed of a plurality of FPGAs or a combination of a CPU and an FPGA.

Further, the plurality of processing units may be composed of one processor. As an example of the plurality of processing units composed of one processor, first, as represented by a computer such as a client or server, there is a form in which one processor is composed of a combination of one or more CPUs and software and this processor functions as a plurality of processing units. Second, as represented by a system on chip (SoC), there is a form in which a processor that realizes the functions of the whole system including a plurality of processing units with a single integrated circuit (IC) chip is used. As described above, the various processing units are configured by using one or more of the various processors as a hardware structure.

Furthermore, the hardware structure of these various processors is more specifically an electric circuit in which circuit elements such as semiconductor elements are combined.

EXPLANATION OF REFERENCES

1: digital camera
2: camera body
2*a*: grip
3: imaging lens
3*f*: focus lens
3*i*: stop
4: rear monitor
11: power lever
12: shutter button
13: exposure compensation dial
14: shutter speed dial
15: finder switching lever
16: command dial
17: view mode button
18: reproduction button
19: erase button
20: function button
21: AE/AF lock button
22: selector button
23: OK button
24: menu button
25: DISP/BACK button
30: viewfinder
30*a*: finder window unit
30*b*: finder eyepiece unit
32: observation optical system
32*a*: objective lens
32*b*: eyepiece lens
34: beam splitter
34*a*: semi-transparent film
36: finder LCD
38: target lens
40: variable ND filter
42: finder shutter
42*a*: finder shutter base plate
42*b*: finder shutter driving unit
44: cover glass
50: lens driving unit
50*f*: focus lens driving unit
50*i*: stop driving unit
52: image sensor
54: image sensor driving unit
56: analog signal processing unit
58: analog-to-digital converter 60: digital signal processing unit
62: AF detection unit
64: photometry unit
66: memory card interface unit
68: memory card
70: rear monitor driver
72: communication interface unit
74: EEPROM
76: operation unit
78: sensor unit
78a: triaxial acceleration sensor
78b: triaxial angular velocity sensor
78c: triaxial geomagnetic sensor
80: time measurement unit
82: finder LCD driver
84: variable ND filter driver
86: power supply unit
86a: battery
86b: power supply circuit
86c: remaining battery capacity detection circuit
100: camera control unit
100a: AF control unit
100b: AE control unit
100c: recording control unit
100d: communication control unit
100e: rear monitor display control unit
100f: power control unit
100g: preliminary imaging operation detection unit
100h: operation restriction unit
110: viewfinder control unit
110a: finder shutter control unit
110b: finder LCD display control unit
110c: target transmittance updating unit
110d: variable ND filter control unit
110e: target transmittance update availability determination unit
120: illuminance sensor
200: single-lens reflex camera
202: imaging lens
204: image sensor
210: reflex finder
212: reflection mirror
214: focusing screen
216: eyepiece lens
218: pentagonal roof prism
220 finder LCD
222: beam splitter
222a: semi-transparent film
224: target lens
226: variable ND filter
BT: threshold value
EP: eye point
F1: visual field frame
F2: AF frame
I1: imaging information
Ld: optical axis
Lo: optical axis
ls: optical axis
z: optical axis
τ1: first transmittance
τ2: second transmittance
S10 to S27: procedure of update processing of target transmittance of variable ND filter during power off

What is claimed is:

1. An imaging apparatus comprising:
an optical finder through which an optical image of a subject is observed;
a display;
a superimposing optical element that is disposed in an optical path of the optical finder so as to superimpose display of the display on the optical image of the subject observed through the optical finder;
a variable ND filter that is disposed in an optical path of the optical finder so as to adjust a light amount of the optical image of the subject incident into the superimposing optical element;
a power switch that turns on and off power of the imaging apparatus;
a clock that measures a time; and
a processor configured to acquire information about the time from the clock and updates a target transmittance of the variable ND filter on the basis of information about a transmittance determined for each time zone, including at least one of a daytime zone and a nighttime zone, while power is turned off, and configured to change the transmittance of the variable ND filter to the target transmittance by driving the variable ND filter in a case where the target transmittance is updated.

2. The imaging apparatus according to claim 1, further comprising:
a preliminary imaging operation detector that detects a preliminary imaging operation; and
an illuminance sensor that measures external light in a case where the preliminary imaging operation detector detects the preliminary imaging operation while power is turned off,
wherein in a case where the preliminary imaging operation detector detects a preliminary imaging operation while power is turned off, the processor acquires a result of photometry of the illuminance sensor, and updates the target transmittance to a transmittance according to the result of photometry of the illuminance sensor.

3. The imaging apparatus according to claim 2, wherein the processor determines whether or not the target transmittance can be updated, in a case where the preliminary imaging operation detector detects the preliminary imaging operation while power is turned off,
wherein in a case where it is determined that the target transmittance can be updated, the processor updates the target transmittance to a transmittance according to the result of photometry of the illuminance sensor.

4. The imaging apparatus according to claim 3,
wherein the processor determines whether or not the target transmittance can be updated on the basis of the result of photometry of the illuminance sensor.

5. The imaging apparatus according to claim 2, further comprising
a level,
wherein the preliminary imaging operation detector detects a horizontal state or a vertical state with the level, and detects a preliminary imaging operation.

6. The imaging apparatus according to claim 2,
wherein the illuminance sensor measures external light on the basis of an output of an image sensor.

7. The imaging apparatus according to claim 2,
wherein the illuminance sensor is composed of an illuminance sensor.

8. The imaging apparatus according to claim 2, further comprising
a remaining battery capacity detector that detects a remaining battery capacity,
wherein the processor restricts update of the target transmittance and operation of the preliminary imaging operation detector in accordance with a remaining battery capacity detected by the remaining battery capacity detector.

9. The imaging apparatus according to claim 1, wherein the optical finder is composed of an optical system, which is independent of an imaging lens, to observe an optical image of a subject incident through a finder window from an eyepiece.

10. The imaging apparatus according to claim 9, wherein the variable ND filter is provided in the finder window.

11. The imaging apparatus according to claim 1, wherein the variable ND filter is composed of the electrochromic element.

12. A finder display control method of an imaging apparatus including an optical finder through which an optical image of a subject is observed, a display, a superimposing optical element that is disposed in an optical path of the optical finder so as to superimpose displaying by the display on the optical image of the subject observed through the optical finder, and a variable ND filter that is disposed in an optical path of the optical finder so as to adjust a light amount of the optical image of the subject incident into the superimposing optical element, the method comprising:
a step of acquiring information about a time and updating a target transmittance of the variable ND filter on the basis of information about a transmittance determined for each time zone, including at least one of a daytime zone and a nighttime zone, while power of the imaging apparatus is turned off; and
a step of changing the transmittance of the variable ND filter to the target transmittance by driving the variable ND filter in a case where the target transmittance is updated.

13. The finder display control method of the imaging apparatus according to claim 12, further comprising:
a step of detecting a preliminary imaging operation while power of the imaging apparatus is turned off;
a step of measuring external light in a case where a preliminary imaging operation is detected;
a step of acquiring a result of photometry of external light and updating the target transmittance to a transmittance according to the result of photometry.

14. The finder display control method of the imaging apparatus according to claim 13, further comprising
a step of determining whether or not the target transmittance can be updated in a case where the preliminary imaging operation is detected,
wherein in a case where it is determined that the target transmittance can be updated, the target transmittance is updated to a transmittance according to the result of photometry of the external light.

15. The finder display control method of the imaging apparatus according to claim 14, further comprising a step of determining whether or not the target transmittance can be updated on the basis of the result of photometry of the external light.

16. A non-transitory and computer-readable recording medium, the recording medium for causing a computer to execute, in a case where instructions stored in the recording medium are read by the computer,
a finder display control function of an imaging apparatus including an optical finder through which an optical image of a subject is observed, a display, a superimposing optical element that is disposed in an optical path of the optical finder so as to superimpose displaying by the display on the optical image of the subject observed through the optical finder, and a variable ND filter that is disposed in an optical path of the optical finder so as to adjust a light amount of the optical image of the subject incident into the superimposing optical element, the function including:
a function of acquiring information about a time and updating a target transmittance of the variable ND filter on the basis of information about a transmittance determined for each time zone, including at least one of a daytime zone and a nighttime zone, while power of the imaging apparatus is turned off; and
a function of changing the transmittance of the variable ND filter to the target transmittance by driving the variable ND filter in a case where the target transmittance is updated.

17. The recording medium according to claim 16, wherein the finder display control function further includes a function of acquiring a result of photometry of external light and updating the target transmittance to a transmittance according to the result of photometry in a case where a preliminary imaging operation is detected while power of the imaging apparatus is turned off.

18. The recording medium according to claim 17, wherein the finder display control function further includes a function of determining whether or not the target transmittance can be updated in a case where the preliminary imaging operation is detected, and
wherein in a case where it is determined that the target transmittance can be updated, the target transmittance is updated to a transmittance according to the result of photometry of the external light.

19. The recording medium according to claim 18, wherein the finder display control function determines whether or not the target transmittance can be updated, on the basis of the result of photometry of the external light.

* * * * *